United States Patent
Kido et al.

(10) Patent No.: US 12,500,271 B2
(45) Date of Patent: Dec. 16, 2025

(54) NON-AQUEOUS ELECTROLYTE SOLUTION AND POWER STORAGE DEVICE USING SAME

(71) Applicant: MU Ionic Solutions Corporation, Tokyo (JP)

(72) Inventors: Taiki Kido, Yokkaichi (JP); Yoshiki Kurihara, Kobe (JP); Hiroyuki Setoguchi, Yokohama (JP); Kei Shimamoto, Shimonoseki (JP)

(73) Assignee: MU Ionic Solutions Corporation, Tokyo (JP)

( * ) Notice: Subject to any disclaimer, the term of this patent is extended or adjusted under 35 U.S.C. 154(b) by 511 days.

(21) Appl. No.: 18/101,637

(22) Filed: Jan. 26, 2023

(65) Prior Publication Data

US 2023/0178808 A1   Jun. 8, 2023

Related U.S. Application Data

(63) Continuation of application No. PCT/JP2021/028306, filed on Jul. 30, 2021.

(30) Foreign Application Priority Data

Jul. 31, 2020  (JP) ................. 2020-130834

(51) Int. Cl.
| | |
|---|---|
| *H01M 10/0525* | (2010.01) |
| *H01M 10/0567* | (2010.01) |
| *H01M 10/0568* | (2010.01) |
| *H01M 10/0569* | (2010.01) |

(52) U.S. Cl.
CPC ... *H01M 10/0568* (2013.01); *H01M 10/0525* (2013.01); *H01M 10/0567* (2013.01); *H01M 10/0569* (2013.01); *H01M 2300/004* (2013.01)

(58) Field of Classification Search
CPC ......... H01M 10/0525; H01M 10/0567; H01M 10/0568; H01M 10/0569
See application file for complete search history.

(56) References Cited

U.S. PATENT DOCUMENTS

| | | |
|---|---|---|
| 2001/0004506 A1 | 6/2001 | Gan et al. |
| 2012/0301797 A1 | 11/2012 | Abe et al. |
| 2013/0034759 A1 | 2/2013 | Funada et al. |
| 2015/0364794 A1 | 12/2015 | Nakazawa et al. |
| 2017/0275311 A1* | 9/2017 | Kotou ............ C07F 9/4084 |
| 2018/0062203 A1 | 3/2018 | Shi et al. |
| 2022/0045389 A1 | 2/2022 | Matsuda |

FOREIGN PATENT DOCUMENTS

| | | |
|---|---|---|
| CN | 104995784 A | 10/2015 |
| CN | 105428715 A | 3/2016 |
| CN | 107732163 A | 2/2018 |
| CN | 109950620 A | 6/2019 |
| JP | 2013-55031 A | 3/2013 |
| JP | 2015-60819 A | 3/2015 |
| JP | 2015-99660 A | 5/2015 |
| JP | 2016-46242 A | 4/2016 |
| JP | 2020-72023 A | 5/2020 |
| WO | WO 2011/096450 A1 | 8/2011 |
| WO | WO 2020/141578 A1 | 7/2020 |

OTHER PUBLICATIONS

Extended European Search Report issued Nov. 29, 2023 in European Patent Application No. 21850757.2, 6 pages.
International Search Report issued Sep. 14, 2021 in PCT/JP2021/028306 filed Jul. 30, 2021, 2 pages.
Written Opinion issued Sep. 14, 2021 in PCT/JP2021/028306, 3 pages.
Combined Chinese Office Action and Search Report issued Jun. 3, 2025 in Chinese Patent Application No. 202160058273.X (with unedited computer-generated English translation). 15 pages.
Japanese Office Action issued May 27, 2025 in Japanese Patent Application No. 2022-539599 (with English translation). 5 pages.

* cited by examiner

*Primary Examiner* — Kevin E Yoon
(74) *Attorney, Agent, or Firm* — Oblon, McClelland, Maier & Neustadt, L.L.P.

(57) ABSTRACT

There is provided a nonaqueous electrolytic solution for an energy storage device which is a nonaqueous electrolytic solution having an electrolyte salt dissolved in a nonaqueous solvent and contains a phosphonate represented by the following general formula (I), and an energy storage device using the same:

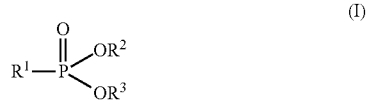

(I)

wherein, $R^1$ represents an alkenyl group having 2 to 6 carbon atoms or an alkynyl group having 3 to 6 carbon atoms, and $R^2$ and $R^3$ each independently represent an alkynyl group having 3 to 6 carbon atoms.

16 Claims, No Drawings

NON-AQUEOUS ELECTROLYTE SOLUTION AND POWER STORAGE DEVICE USING SAME

TECHNICAL FIELD

The present invention relates to a nonaqueous electrolytic solution and an energy storage device using the same.

BACKGROUND ART

An energy storage device, especially a lithium secondary battery, has been widely used recently for a power source of a small-sized electronic device, such as a mobile telephone and a notebook personal computer, and a power source for an electric vehicle or electric power storage. There is a possibility that such an electronic device or a vehicle is used in a wide temperature range, such as a high temperature in midsummer and an extremely low temperature. Therefore, the energy storage device is required to improve electrochemical characteristics in a wide temperature range in a well-balanced manner.

In particular, it is urgently necessary to reduce a $CO_2$ emission amount in order to prevent global warming, and among eco-friendly vehicles equipped with an energy storage apparatus that includes an energy storage device, such as a lithium secondary battery and a capacitor, hybrid electric vehicles (HEV), plug-in hybrid electric vehicles (PHEV), and battery electric vehicles (BEV) are required for early popularization. Since the vehicles travel a long distance, there is a possibility that the vehicles are used in regions with a wide temperature range, from a very hot tropical region to an extremely cold region. Therefore, in particular, these on-board energy storage devices are required to have electrochemical characteristics that do not worsen even when used in a wide temperature range from a high temperature to a low temperature.

In the present specification, the term "lithium secondary battery" is used as a concept including a so-called lithium ion secondary battery.

A lithium secondary battery mainly contains a positive electrode and a negative electrode, each containing a material capable of absorbing and releasing lithium ions, and a nonaqueous electrolytic solution containing a lithium salt and a nonaqueous solvent. A carbonate, such as ethylene carbonate (EC) and propylene carbonate (PC), is used as the nonaqueous solvent.

In addition, metal lithium, a metal compound capable of absorbing and releasing lithium ions (e.g., an elemental metal, a metal oxide, and an alloy with lithium), a carbon material, and the like are known in the negative electrode. In particular, a lithium secondary battery using a carbon material capable of absorbing and releasing lithium ions, such as coke, artificial graphite, and natural graphite, is widely put into practical use.

For example, in a lithium secondary battery using a highly crystallized carbon material, such as natural graphite and artificial graphite, as the negative electrode material, a solvent in a nonaqueous electrolytic solution is reductively decomposed on a negative electrode surface during charging. It is known that decomposed products and generated gases generated by the reductive decomposition inhibit a desirable electrochemical reaction of the battery, and therefore, cycle properties of the lithium secondary battery are worsened. In addition, when the decomposed products of the nonaqueous solvent are accumulated, the absorbing and releasing of lithium ions from and into the negative electrode cannot be smoothly performed, and electrochemical characteristics in the case of using the battery in a wide temperature range are apt to be worsened.

Further, it is known that a lithium secondary battery using metal lithium or an alloy thereof, an elemental metal, such as tin and silicon, or a metal oxide thereof as the negative electrode material has a high initial capacity, but micronized powdering of the material is promoted during cycles, which brings about accelerated reductive decomposition of the nonaqueous solvent, and large worsening in battery performance, such as a battery capacity and cycle properties, as compared with the negative electrode formed of a carbon material. In addition, when the negative electrode material is subjected to micronized powdering or the decomposed products of the nonaqueous solvent are accumulated, the absorbing and releasing of lithium ions from and into the negative electrode cannot be smoothly performed, and the electrochemical characteristics are apt to be worsened in the case of using the battery in a wide temperature range.

Meanwhile, in a lithium secondary battery using, for example, $LiCoO_2$, $LiMn_2O_4$, $LiNiO_2$, or $LiFePO_4$ in the positive electrode, a part of a nonaqueous solvent in a nonaqueous electrolytic solution is oxidized and decomposed locally at an interface between the positive electrode material and the nonaqueous electrolytic solution in a charged state. It is known that decomposed products and generated gases generated by the oxidative decomposition inhibit a desirable electrochemical reaction of the battery, and therefore, electrochemical characteristics of the lithium secondary battery are worsened in the case of using the battery in a wide temperature range.

As described above, the decomposed products and the generated gases generated when the nonaqueous electrolytic solution is decomposed on the positive electrode or the negative electrode inhibit smooth movement of lithium ions or cause expansion of the battery, thereby worsening the battery performance. Irrespective of the above situation, the multifunctionality of electronic devices on which lithium secondary batteries are mounted is more and more advanced, and power consumption tends to increase. Therefore, the capacity of the lithium secondary battery is being more and more increased, the density of the electrode is increased, and a useless space volume within the battery is reduced. Thus, a volume occupied by the nonaqueous electrolytic solution in the battery is becoming small. Therefore, it is the present situation that the electrochemical characteristics in the case of using the battery in a wide temperature range are apt to be worsened by decomposition of a small amount of nonaqueous electrolytic solution.

PTL 1 discloses that worsening of battery characteristics under a high-temperature environment can be prevented by containing at least one phosphorus compound selected from the group consisting of a specific phosphine oxide, a specific phosphonate, and a specific phosphinate in a nonaqueous electrolytic solution.

PTL 2 discloses that a discharge capacity retention rate and a resistance value retention rate at 25° C. are improved by containing a specific phosphate or phosphonate in a nonaqueous electrolytic solution.

PTL 3 discloses that energy efficiency of a lithium-air battery is remarkably improved by combining an organic solvent, which is a specific phosphate and/or phosphonate, with lithium nitrate having a concentration within a specific range.

PTL 4 discloses that cycle properties at a low temperature and a high temperature and load characteristics after high-temperature charging storage are improved by adding, to a nonaqueous electrolytic solution, an alkynyl compound having a specific structure in which an alkynyl group is bonded via a specific group.

CITATION LIST

Patent Literature

PTL 1: JP 2013-55031 A
PTL 2: JP 2020-72023 A
PTL 3: WO 2020/141578
PTL 4: WO 2011/096450

SUMMARY OF INVENTION

Technical Problem

An object of the present invention is to provide a nonaqueous electrolytic solution capable of improving a discharge capacity retention rate and a gas generation preventing effect in an energy storage device after high-temperature storage, and an energy storage device using the same.

Solution to Problem

In order to solve the above problem, the present inventors have made extensive investigations, and have found that by containing a compound obtained by introducing a specific alkynyl group into a phosphonate having a specific alkenyl group or alkynyl group in a nonaqueous electrolytic solution having an electrolyte salt dissolved in a nonaqueous solvent, a discharge capacity retention rate and a gas generation preventing effect in an energy storage device after high-temperature storage are specifically improved, leading to accomplishment of the present invention. Such effects are not suggested at all in PTLs 1 to 4.

Specifically, the present invention provides the following (1) to (17).

(1) A nonaqueous electrolytic solution for an energy storage device, which is a nonaqueous electrolytic solution having an electrolyte salt dissolved in a nonaqueous solvent, the nonaqueous electrolytic solution comprising:
a phosphonate represented by the following general formula (I):

(I)

wherein $R^1$ represents an alkenyl group having 2 to 6 carbon atoms or an alkynyl group having 3 to 6 carbon atoms, and $R^2$ and $R^3$ each independently represent an alkynyl group having 3 to 6 carbon atoms.

(2) The nonaqueous electrolytic solution for an energy storage device according to the above (1), in which a content of the phosphonate represented by the general formula (I) is 0.001% by mass or more and 5% by mass or less.

(3) The nonaqueous electrolytic solution for an energy storage device according to the above (1) or (2), in which $R^1$ in the general formula (I) is a vinyl group, an allyl group, a 1-methylallyl group, a 2-methylallyl group, a crotyl group, a butenyl group, or a propynyl group.

(4) The nonaqueous electrolytic solution for an energy storage device according to the above (1) or (2), in which $R^1$ in the general formula (I) is a vinyl group or an allyl group.

(5) The nonaqueous electrolytic solution for an energy storage device according to any one of the above (1) to (4), in which $R^2$ and $R^3$ in the general formula (I) each independently represent a 2-propynyl group, a 2-butynyl group, a 3-butynyl group, a 1-methyl-2-propynyl group, a 1,1-dimethyl-2-propynyl group, a 1-ethyl-1-methyl-2-propynyl group, or a 4-pentynyl group.

(6) The nonaqueous electrolytic solution for an energy storage device according to any one of the above (1) to (5), in which the nonaqueous electrolytic solution further comprises one or more lithium salts (a) selected from the group consisting of a lithium salt having a phosphoric acid structure and a lithium salt having an S(=O) group.

(7) The nonaqueous electrolytic solution for an energy storage device according to the above (6), in which a content of the lithium salt (a) is 0.01% by mass or more and 8% by mass or less.

(8) The nonaqueous electrolytic solution for an energy storage device according to any one of the above (1) to (7), in which the electrolyte salt comprises one or more lithium salts (b) selected from the group consisting of $LiPF_6$, $LiBF_4$, $LiN(SO_2CF_3)_2$, $LiN(SO_2C_2F_5)_2$, and $LiN(SO_2F)_2$ [LiFSI].

(9) The nonaqueous electrolytic solution for an energy storage device according to the above (8), in which a content of the lithium salt (b) is 4% by mass or more and 28% by mass or less.

(10) The nonaqueous electrolytic solution for an energy storage device according to any one of the above (1) to (9), in which the phosphonate comprises one or more selected from the group consisting of di-2-propynyl vinylphosphonate, di-2-propynyl allylphosphonate, di-2-propynyl 1-methylallylphosphonate, di-2-propynyl 2-methylallylphosphonate, di-2-propynyl crotylphosphonate, di-2-propynyl butenylphosphonate, and di-2-propynyl propynylphosphonate.

(11) The nonaqueous electrolytic solution for an energy storage device according to any one of the above (1) to (10), in which the nonaqueous solvent comprises one or more selected from the group consisting of a saturated cyclic carbonate, a linear ester, a lactone, an ether, and an amide.

(12) The nonaqueous electrolytic solution for an energy storage device according to any one of the above (1) to (11), in which the nonaqueous solvent comprises a saturated cyclic carbonate and a linear ester, and a ratio (mass ratio) of the cyclic carbonate to the linear ester is 10:90 to 50:50.

(13) The nonaqueous electrolytic solution for an energy storage device according to any one of the above (1) to (12), further comprising at least one of a cyclic carbonate having an unsaturated bond and a cyclic carbonate having a fluorine atom.

(14) The nonaqueous electrolytic solution for an energy storage device according to the above (13), in which a content of the cyclic carbonate having an unsaturated bond is 0.05% by mass or more and 8% by mass or less.

(15) An energy storage device comprising:
a positive electrode;
a negative electrode; and
a nonaqueous electrolytic solution having an electrolyte salt dissolved in a nonaqueous solvent, in which
the nonaqueous electrolytic solution is the nonaqueous electrolytic solution according to any one of above (1) to (14).

(16) The energy storage device according to the above (15), in which the energy storage device is a lithium battery.

(17) The energy storage device according to the above (15) or (16), in which a proportion of an atomic concentration of Ni to an atomic concentration of all transition metal elements in a positive electrode active material in the positive electrode is 50 atomic % or more.

Advantageous Effects of Invention

According to the present invention, it is possible to provide a nonaqueous electrolytic solution capable of improving a discharge capacity retention rate and a gas generation preventing effect in an energy storage device after high-temperature storage, and an energy storage device using the same.

DESCRIPTION OF EMBODIMENTS

The present invention relates to a nonaqueous electrolytic solution and an energy storage device using the same.
[Nonaqueous Electrolytic Solution]
The nonaqueous electrolytic solution according to the present invention is a nonaqueous electrolytic solution for an energy storage device, which is a nonaqueous electrolytic solution having an electrolyte salt dissolved in a nonaqueous solvent, and contains the phosphonate represented by the general formula (I).

A reason why the nonaqueous electrolytic solution according to the present invention can improve a discharge capacity retention rate and a gas generation preventing effect in the energy storage device after high-temperature storage is not necessarily clear, but is considered as follows.

Since the compound represented by the general formula (I) and used in the present invention is a phosphonate having a specific alkenyl group or alkynyl group, reductive decomposition is promoted. Further, since the compound represented by the general formula (I) has a specific alkenyl group or alkynyl group in $R^1$ and specific alkynyl groups in $R^2$ and $R^3$, a polymerization reaction is further promoted, and a strong surface film having high heat resistance is formed. For this reason, it is considered that decomposition of a solvent can be prevented without the surface film becoming brittle even in a high-temperature environment, and the discharge capacity retention rate and the gas generation preventing effect in the energy storage device after high-temperature storage can be improved at the same time.
(Phosphonate)
The phosphonate contained in the nonaqueous electrolytic solution according to the present invention is represented by the following general formula (I).

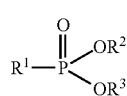
(I)

wherein, $R^1$ represents an alkenyl group having 2 to 6 carbon atoms or an alkynyl group having 3 to 6 carbon atoms, and $R^2$ and $R^3$ each independently represent an alkynyl group having 3 to 6 carbon atoms.

In the general formula (I), $R^1$ is preferably a vinyl group, an allyl group, a 1-methylallyl group, a 2-methylallyl group, a crotyl group, a butenyl group, or a propynyl group, more preferably a vinyl group, an allyl group, a 1-methylallyl group, a 2-methylallyl group, or a crotyl group, even more preferably a vinyl group, an allyl group, or a crotyl group, still more preferably a vinyl group or an allyl group, and particularly preferably an allyl group.

In the general formula (I), $R^2$ and $R^3$ each independently represent an alkynyl group having 3 to 6 carbon atoms, and specific suitable examples thereof include linear alkynyl groups, such as a 2-propynyl group, a 2-butynyl group, a 3-butynyl group, a 4-pentynyl group, and a 4-heptynyl group; and branched alkynyl groups, such as a 1-methyl-2-propynyl group, a 1,1-dimethyl-2-propynyl group, a 1-methyl-3-butynyl group, and a 1-methyl-4-pentynyl group. Among them, a 2-propynyl group, a 2-butynyl group, a 3-butynyl group, a 1-methyl-2-propynyl group, a 1,1-dimethyl-2-propynyl group, a 1-ethyl-1-methyl-2-propynyl group, or a 4-pentynyl group is more preferred, and a 2-propynyl group is even more preferred.

Specific suitable examples of the compound represented by the general formula (I) include the following compounds.

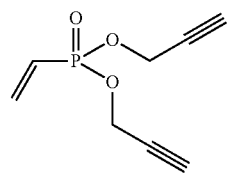
COMPOUND 1-1

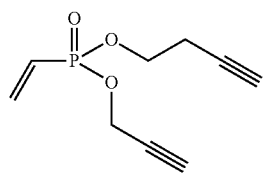
COMPOUND 1-2

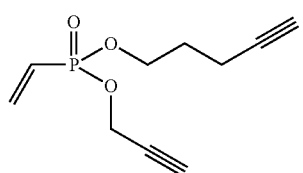
COMPOUND 1-3

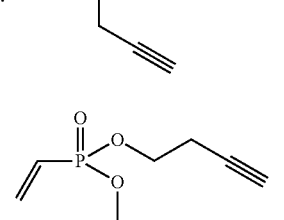
COMPOUND 1-4

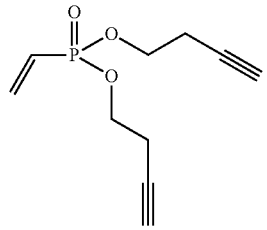
COMPOUND 1-5

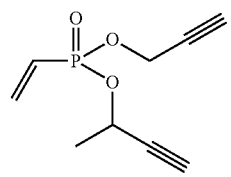

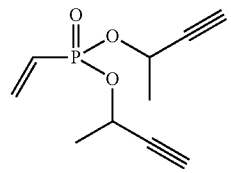
COMPOUND 1-6

COMPOUND 1-7

COMPOUND 1-8

COMPOUND 1-9

COMPOUND 1-10

COMPOUND 1-11

COMPOUND 1-12

COMPOUND 2-1

COMPOUND 2-2

COMPOUND 2-3

COMPOUND 2-4

COMPOUND 2-5

COMPOUND 2-6

COMPOUND 2-7

COMPOUND 2-8

COMPOUND 2-9

COMPOUND 2-10

COMPOUND 2-11
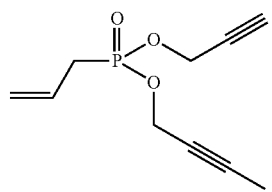
COMPOUND 2-12
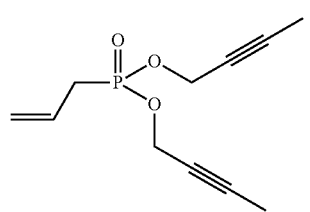
COMPOUND 3-1
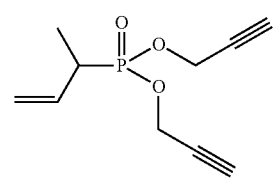
COMPOUND 3-2
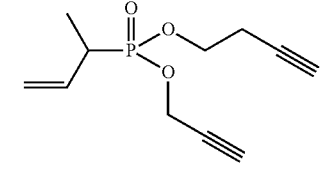
COMPOUND 3-3
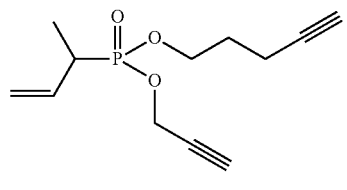
COMPOUND 3-4
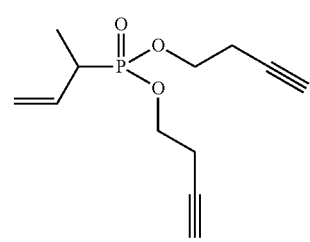
COMPOUND 3-5
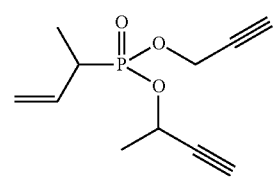
COMPOUND 3-6
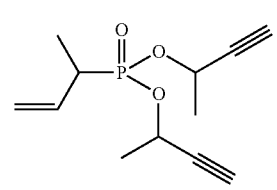
COMPOUND 3-7
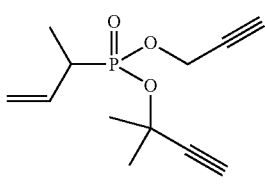
COMPOUND 3-8
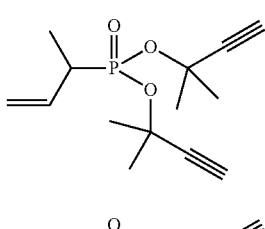
COMPOUND 3-9
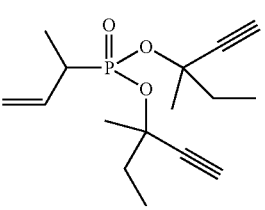
COMPOUND 3-10
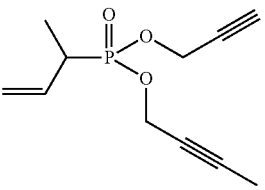
COMPOUND 3-11
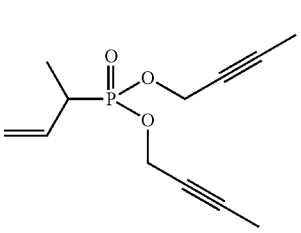
COMPOUND 3-12
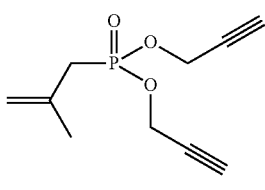
COMPOUND 4-1
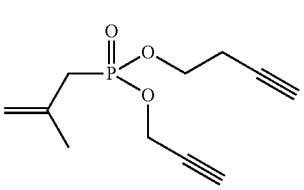
COMPOUND 4-2

COMPOUND 4-3
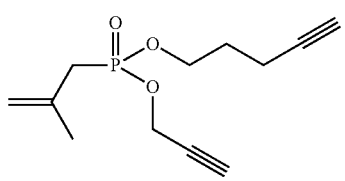
COMPOUND 4-4
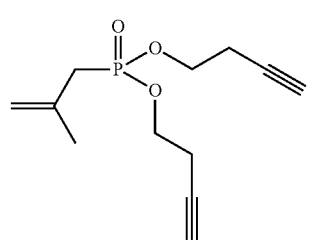
COMPOUND 4-5
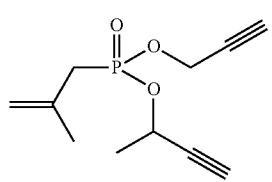
COMPOUND 4-6
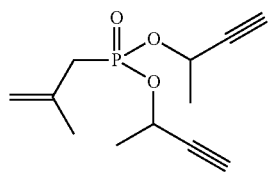
COMPOUND 4-7
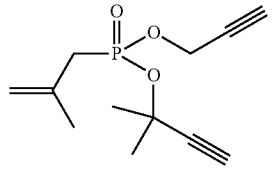
COMPOUND 4-8
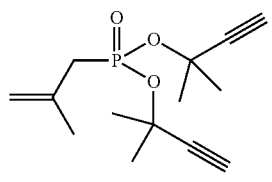
COMPOUND 4-9
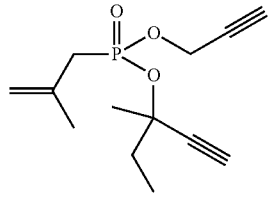
COMPOUND 4-10
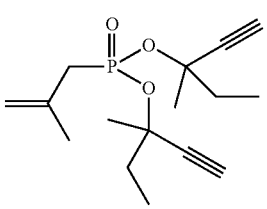
COMPOUND 4-11
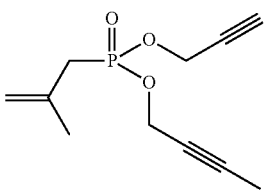
COMPOUND 4-12
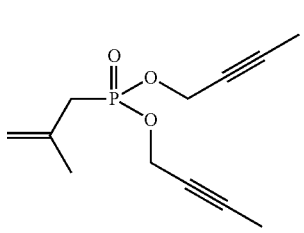
COMPOUND 5-1
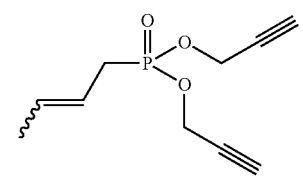
COMPOUND 5-2
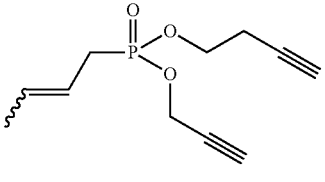
COMPOUND 5-3
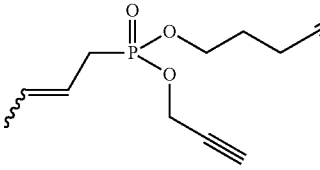
COMPOUND 5-4
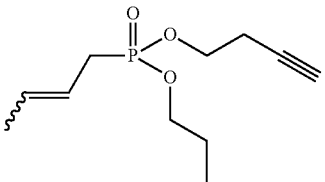
COMPOUND 5-5
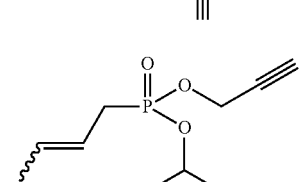
COMPOUND 5-6
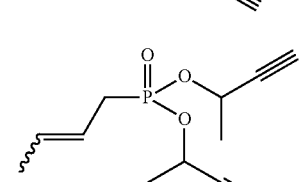

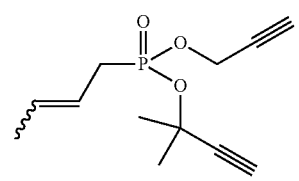 COMPOUND 5-7
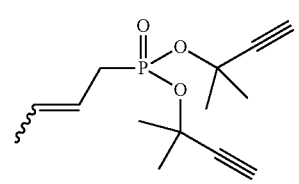 COMPOUND 5-8
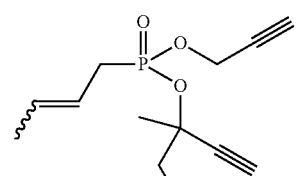 COMPOUND 5-9
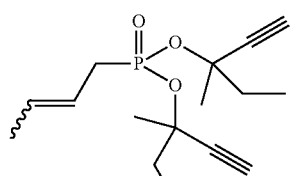 COMPOUND 5-10
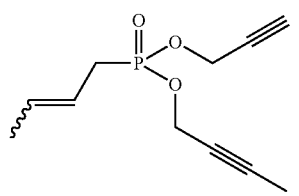 COMPOUND 5-11
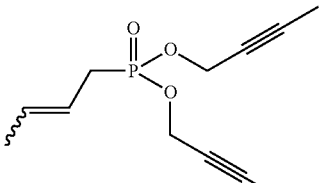 COMPOUND 5-12
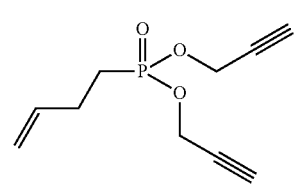 COMPOUND 6-1
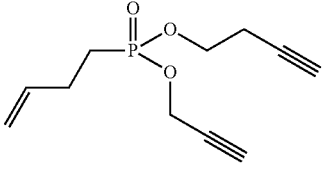 COMPOUND 6-2
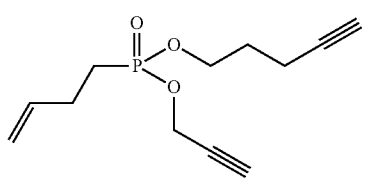 COMPOUND 6-3
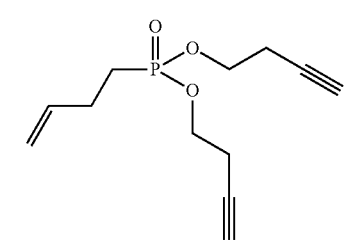 COMPOUND 6-4
 COMPOUND 6-5
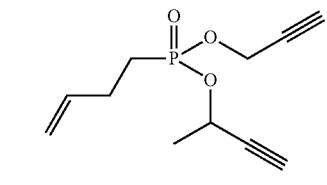 COMPOUND 6-6
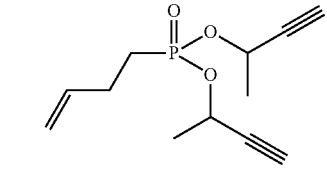 COMPOUND 6-7
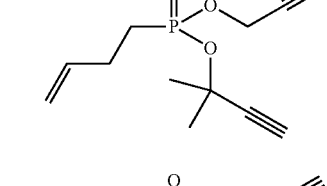 COMPOUND 6-8
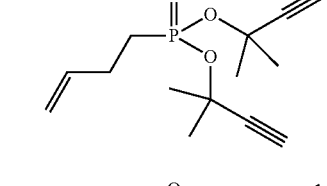 COMPOUND 6-9
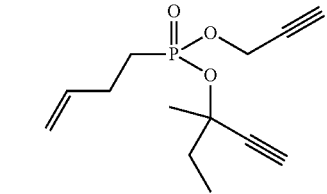 COMPOUND 6-10

-continued

COMPOUND 6-11
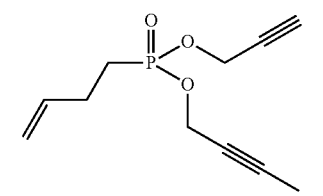

COMPOUND 6-12
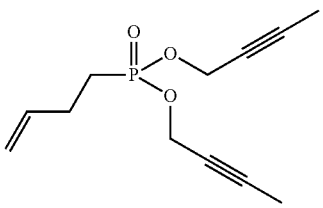

COMPOUND 7-1
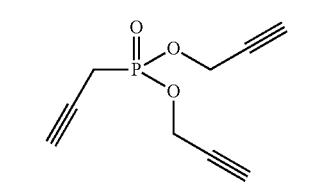

COMPOUND 7-2
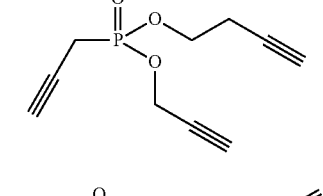

COMPOUND 7-3
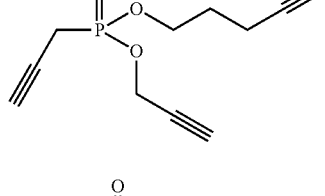

COMPOUND 7-4
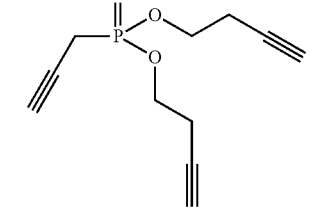

COMPOUND 7-5
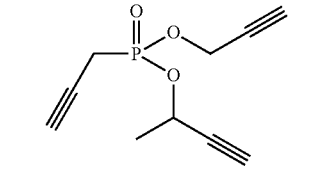

COMPOUND 7-6
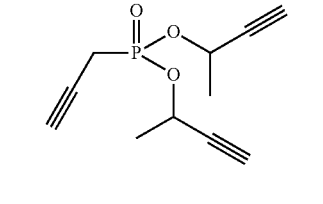

-continued

COMPOUND 7-7
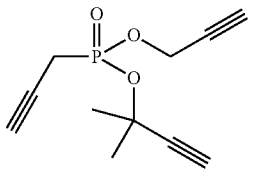

COMPOUND 7-8
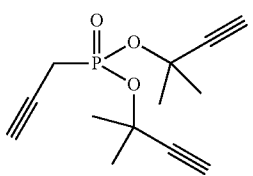

COMPOUND 7-9
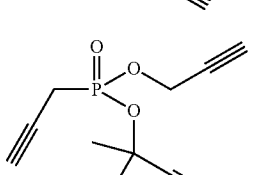

COMPOUND 7-10
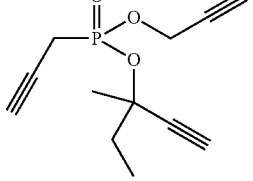

COMPOUND 7-11
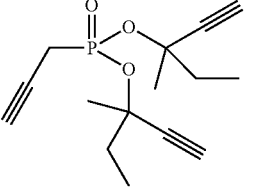

COMPOUND 7-12
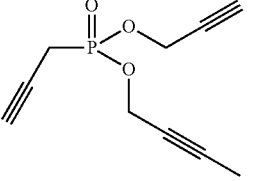

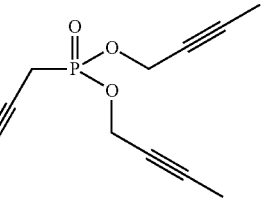

Among the suitable examples, one or more selected from the group consisting of di-2-propynyl vinylphosphonate (compound 1-1), di-3-butynyl vinylphosphonate (compound 1-4), di-1-methyl-2-propynyl vinylphosphonate (compound 1-6), di-1,1-dimethyl-2-propynyl vinylphosphonate (compound 1-8), di-1-ethyl-1-methyl-2-propynyl vinylphosphonate (compound 1-10), di-2-butynyl vinylphosphonate (compound 1-12), di-2-propynyl allylphosphonate (compound 2-1), di-3-butynyl allylphosphonate (compound 2-4), di-1-methyl-2-propynyl allylphosphonate (compound 2-6), di-1,1-dimethyl-2-propynyl allylphosphonate (compound 2-8), di-1-ethyl-1-methyl-2-propynyl allylphosphonate (compound 2-10), di-2-butynyl allylphosphonate (compound 2-12), di-2-propynyl 1-methylallylphosphonate (compound 3-1), di-2-propynyl 2-methylallylphosphonate (compound 4-1), di-2-propynyl crotylphosphonate (compound 5-1), di-2-propynyl 3-butenylphosphonate (compound 6-1), and di-2-propynyl propynylphosphonate (compound 7-1) are preferred. Among them, one or more compounds selected from the group consisting of di-2-propynyl vinylphosphonate (compound 1-1), di-1-methyl-2-propynyl vinylphosphonate (compound 1-6), di-1,1-dimethyl-2-propynyl vinylphosphonate (compound 1-8), di-1-ethyl-1-methyl-2-propynyl vinylphosphonate (compound 1-10), di-2-butynyl vinylphosphonate (compound 1-12), di-2-propynyl allylphosphonate (compound 2-1), di-1-methyl-2-propynyl allylphosphonate (compound 2-6), di-1,1-dimethyl-2-propynyl allylphosphonate (compound 2-8), di-1-ethyl-1-methyl-2-propynyl allylphosphonate (compound 2-10), di-2-propynyl 1-methylallylphosphonate (compound 3-1), di-2-propynyl 2-methylallylphosphonate (compound 4-1), di-2-propynyl crotylphosphonate (compound 5-1), di-2-propynyl butenylphosphonate (compound 6-1), and di-2-propynyl propyuylphosphonate (compound 7-1) are more preferred. One or more compounds selected from the group consisting of di-2-propynyl vinylphosphonate (compound 1-1), di-2-propynyl allylphosphonate (compound 2-1), di-2-propynyl 1-methylallylphosphonate (compound 3-1), di-2-propynyl 2-methylallylphosphonate (compound 4-1), di-2-propynyl crotylphosphonate (compound 5-1), di-2-propynyl butenylphosphonate (compound 6-1), and di-2-propynyl propynylphosphonate (compound 7-1) are even more preferred. One or more compounds selected from the group consisting of di-2-propynyl vinylphosphonate (compound 1-1), di-2-propynyl allylphosphonate (compound 2-1) and di-2-propynyl crotylphosphonate (compound 5-1) are still more preferred. Di-2-propynyl vinylphosphonate (compound 1-1) and di-2-propynyl allylphosphonate (compound 2-1) are even still more preferred. Di-2-propynyl allylphosphonate (compound 2-1) is particularly preferred.

The nonaqueous electrolytic solution according to the present invention may contain one or more phosphonates represented by the general formula (I).

A content of the phosphonate represented by the general formula (I) in the nonaqueous electrolytic solution according to the present invention is preferably 0.001% by mass or more, and is preferably 5% by mass or less, and more preferably 2% by mass or less with respect to a total amount of the nonaqueous electrolytic solution (when the total amount of the nonaqueous electrolytic solution is 100% by mass). When the content is 5% by mass or less or 2% by mass or less, there is less concern that a surface film is excessively formed on an electrode and high-temperature properties are worsened. When the content is 0.001% by mass or more, formation of the surface film is sufficient and the discharge capacity retention rate after high-temperature storage can be further improved. The content is more preferably 0.05% by mass or more, even more preferably 0.1% by mass or more, still more preferably 0.15% by mass or more, even still more preferably 0.25% by mass or more, yet still more preferably 0.35% by mass or more, even yet still more preferably 0.55% by mass or more, and particularly preferably 0.80% by mass or more, and is even more preferably 1.5% by mass or less, and still more preferably 1.2% by mass or less.

(Lithium Salt (a))

The nonaqueous electrolytic solution according to the present invention preferably further contains one or more lithium salts (a) selected from the group consisting of a lithium salt having a phosphoric acid structure and a lithium salt having an S(=O) group. By further containing the lithium salt (a), the discharge capacity retention rate and the gas generation preventing effect after high-temperature storage can be further improved.

Specific suitable examples of the lithium salt (a) include a lithium salt having a phosphoric acid structure, such as $LiPO_2F_2$ and $Li_2PO_3F$; and one or more lithium salts having an S(=O) group, which are selected from the group consisting of lithium trifluoro ((methanesulfonyl)oxy) borate [LiTFMSB], lithium pentafluoro ((methanesulfonyl)oxy) phosphate [LiPFMSP], lithium methyl sulfate [LMS], lithium ethyl sulfate [LES], lithium 2,2,2-trifluoroethyl sulfate [LFES], and $FSO_3Li$. The lithium salt (a) more preferably contains one or more lithium salts selected from the group consisting of $LiPO_2F_2$, LiTFMSB, LMS, LES, LFES, and $FSO_3Li$, and even more preferably contains $LiPO_2F_2$.

A content of the lithium salt (a) in the nonaqueous electrolytic solution according to the present invention is preferably 0.01% by mass or more and 8% by mass or less with respect to the total amount of the nonaqueous electrolytic solution. When the content falls within this range, the discharge capacity retention rate and the gas generation preventing effect after high-temperature storage can be further improved. The content is more preferably 0.1% by mass or more, even more preferably 0.3% by mass or more, and particularly preferably 0.4% by mass or more, and is more preferably 6% by mass or less, even more preferably 3% by mass or less, and particularly preferably 2% by mass or less with respect to the total amount of the nonaqueous electrolytic solution.

(Electrolyte Salt)

Suitable examples of the electrolyte salt used in the present invention include the following lithium salt (b).

Specific suitable examples of the lithium salt (b) include an inorganic lithium salt, such as $LiPF_6$, $LiBF_4$, or $LiClO_4$; a lithium salt having a linear fluorinated alkyl group, such as $LiN(SO_2F)_2$ [LiFSI], $LiN(SO_2CF_3)_2$, $LiN(SO_2C_2F_5)_2$, $LiCF_3SO_3$, $LiC(SO_2CF_3)_3$, $LiPF$, $(CF_3)_2$, $LiPF_3(C_2F_5)_3$, $LiPF_3(CF_3)_3$, $LiPF_3$ (iso-$C_3F_7$)$_3$, and $LiPF_5$(iso-$C_3F_7$); and a lithium salt having a cyclic fluorinated alkylene chain, such as $(CF_2)_2(SO_2)_2NLi$ and $(CF_2)_3(SO_2)_2NLi$. One or more of these can be mixed and used.

Among them, one or more selected from the group consisting of $LiPF_6$, $LiBF_4$, $LiN(SO_2CF_3)_2$, $LiN(SO_2C_2F_5)_2$, and $LiN(SO_2F)_2$ [LiFSI] are more preferred, and $LiPF_6$ is even more preferred.

A content of the lithium salt (b) in the nonaqueous electrolytic solution according to the present invention is preferably 4% by mass or more, more preferably 9% by mass or more, and even more preferably 13% by mass or more with respect to the total amount of the nonaqueous electrolytic solution. An upper limit thereof is preferably 28% by mass or less, more preferably 23% by mass or less, and even more preferably 20% by mass or less with respect to the total amount of the nonaqueous electrolytic solution.

As a suitable combination of these electrolyte salts, the case where $LiPF_6$ is contained and at least one lithium salt selected from the group consisting of $LiBF_4$, $LiN(SO_2CF_3)_2$ and $LiN(SO_2F)_2$ [LiFSI] is further contained in the nonaqueous electrolytic solution is preferred, and a combination that the nonaqueous electrolytic solution contains $LiPF_6$ and further contains LiFSI is more preferred. It is preferred that a content of the lithium salt other than $LiPF_6$ in the nonaqueous electrolytic solution according to the present invention is 0.01% by mass or more with respect to the total amount of the nonaqueous electrolytic solution since the characteristics after high-temperature charging storage (hereinafter, also referred to as "high-temperature charging storage properties") are improved and the gas generation preventing effect is also improved. It is preferred that the content is 11% by mass or less with respect to the total amount of the nonaqueous electrolytic solution since there is less concern that the high-temperature charging storage properties are worsened. The content is preferably 0.1% by mass or more, more preferably 0.3% by mass or more, and even more preferably 0.6% by mass or more, and is preferably 10% by mass or less, more preferably 9% by mass or less, and even more preferably 6% by mass or less with respect to the total amount of the nonaqueous electrolytic solution.

(Nonaqueous Solvent)

Suitable examples of the nonaqueous solvent that is used for the nonaqueous electrolytic solution according to the present invention include one or more selected from the group consisting of a cyclic carbonate, a linear ester, a lactone, an ether, and an amide. In order to synergistically improve the electrochemical characteristics in a wide temperature range, it is preferred that a linear ester is contained, it is more preferred that a linear carbonate is contained, it is even more preferred that both a cyclic carbonate and a linear ester are contained, and it is particularly preferred that both a cyclic carbonate and a linear carbonate are contained.

The term "linear ester" is used as a concept including a linear carbonate and a linear carboxylate.

It is preferred that the cyclic carbonate further contains at least one of saturated cyclic carbonates. Examples of the saturated cyclic carbonate include one or more selected from the group consisting of ethylene carbonate (EC), propylene carbonate (PC), 1,2-butylene carbonate, and 2,3-butylene carbonate. One or more selected from the group consisting of ethylene carbonate and propylene carbonate are preferred, and ethylene carbonate is more preferred.

A content of the cyclic carbonate in the nonaqueous electrolytic solution according to the present invention is preferably 5% by mass or more, more preferably 10% by mass or more, and even more preferably 20% by mass or more, and is preferably 90% by mass or less, more preferably 70% by mass or less, even more preferably 50% by mass or less, and particularly preferably 40% by mass or less with respect to the total amount of the nonaqueous electrolytic solution. It is preferred that the content of the cyclic carbonate is equal to or less than the upper limit since the discharge capacity retention rate and the gas generation preventing effect after high-temperature storage are further improved without impairing Li ion permeability.

In the nonaqueous electrolytic solution according to the present invention, it is preferred that at least one of a cyclic carbonate having an unsaturated bond, such as a carbon-carbon double bond or a carbon-carbon triple bond, and a cyclic carbonate having a fluorine atom is further contained, and it is more preferred that a cyclic carbonate having an unsaturated bond is further contained. It is preferred that the nonaqueous electrolytic solution according to the present invention contains the cyclic carbonate since the discharge capacity retention rate and the gas generation preventing effect after high-temperature storage are improved. As the cyclic carbonate having an unsaturated bond, vinylene carbonate (VC), vinylethylene carbonate (VEC), or 4-ethynyl-1,3-dioxolan-2-one (EEC) is preferred, and vinylene carbonate is more preferred. As the cyclic carbonate having a fluorine atom, 4-fluoro-1,3-dioxolan-2-one (FEC), and trans- or cis-4,5-difluoro-1,3-dioxolan-2-one (hereinafter, both are collectively referred to as "DFEC") are preferred.

A content of the cyclic carbonate having an unsaturated bond in the nonaqueous electrolytic solution according to the present invention is preferably 0.05% by mass or more, more preferably 0.1% by mass or more, and even more preferably 0.5% by mass or more, and is preferably 8% by mass or less, more preferably 5% by mass or less, and even more preferably 3% by mass or less with respect to the total amount of the nonaqueous electrolytic solution. It is preferred that the content falls within the above range since the discharge capacity retention rate and the gas generation preventing effect after high-temperature storage are further improved without impairing Li ion permeability.

A content of the cyclic carbonate having a fluorine atom in the nonaqueous electrolytic solution according to the present invention is preferably 0.05% by mass or more, more preferably 1% by mass or more, and even more preferably 3% by mass or more, and is preferably 40% by mass or less, more preferably 30% by mass or less, even more preferably 20% by mass or less, and particularly preferably 15% by mass or less with respect to the total amount of the nonaqueous electrolytic solution. It is preferred that the content falls within the above range since the discharge capacity retention rate and the gas generation preventing effect after high-temperature storage are further improved without impairing Li ion permeability.

These solvents may be used alone. It is preferred that a combination of two or more of the solvents is used since an effect of improving the electrochemical characteristics in a wide temperature range is further improved. Use of a combination of three or more thereof is particularly preferred. As suitable combinations of these cyclic carbonates, EC and PC; EC and VC; PC and VC; VC and FEC; EC and FEC; PC and FEC; FEC and DFEC; EC and DFEC; PC and DFEC; VC and DFEC; VEC and DFEC; VC and EEC; EC and EEC; EC, PC and VC; EC, PC and FEC; EC, VC and FEC; EC, VC and VEC; EC, VC and EEC; EC, EEC and FEC; PC, VC and FEC; EC, VC and DFEC; PC, VC and DFEC; EC, PC, VC and FEC; EC, PC, VC and DFEC; or the like is preferred. Among the above combinations, a combination of EC and VC; EC and FEC; PC and FEC; EC, PC and VC; EC, PC and FEC; EC, VC and FEC; EC, VC and EEC; EC, EEC and FEC; PC, VC and FEC; EC, PC, VC and FEC; or the like is more preferred. A combination of EC and VC is even more preferred.

Suitable examples of the linear ester include one or more asymmetric linear carbonates selected from the group consisting of methyl ethyl carbonate (MEC), methyl propyl carbonate (MPC), methyl isopropyl carbonate (MIPC), methyl butyl carbonate, and ethyl propyl carbonate; one or more symmetrical linear carbonates selected from the group consisting of dimethyl carbonate (DMC), diethyl carbonate (DEC), dipropyl carbonate, and dibutyl carbonate; and one or more linear carboxylates selected from the group consisting of pivalates, such as methyl pivalate, ethyl pivalate, and propyl pivalate, methyl propionate, ethyl propionate, propyl propionate, methyl acetate, and ethyl acetate.

Among the linear esters, a linear ester having a methyl group, which is selected from the group consisting of dimethyl carbonate, methyl ethyl carbonate, methyl propyl carbonate, methyl isopropyl carbonate, methyl butyl carbonate, methyl propionate, methyl acetate, and ethyl acetate, is preferred, a linear carbonate having a methyl group is more preferred, and at least one selected from methyl ethyl carbonate and dimethyl carbonate is even more preferred.

In the case of using a linear carbonate, it is preferred to use two or more types thereof. Further, it is more preferred that both the symmetric linear carbonate and the asymmetric linear carbonate are contained, and it is even more preferred that a content of the symmetric linear carbonate is larger than that of the asymmetric linear carbonate.

A content of the linear ester in the nonaqueous electrolytic solution according to the present invention is not particularly limited, and is preferably 5% by mass or more and 90% by mass or less with respect to the total amount of the nonaqueous electrolytic solution. It is preferred that the content is 5% by mass or more since a viscosity of the nonaqueous electrolytic solution does not become too high, and it is preferred that the content is 90% by mass or less since there is less concern that an electroconductivity and the cycle properties of the nonaqueous electrolytic solution are worsened. The content is more preferably 10% by mass or more, even more preferably 30% by mass or more, and particularly preferably 50% by mass or more, and is more preferably 85% by mass or less.

When the nonaqueous electrolytic solution according to the present invention contains both the cyclic carbonate and the linear ester, as for a proportion of the cyclic carbonate to the linear ester contained in the nonaqueous electrolytic solution, from the viewpoint of improving the electrochemical characteristics at a high temperature, a ratio (mass ratio) of the cyclic carbonate to the linear ester is preferably 10:90 to 50:50, and more preferably 30:70 to 40:60.

Suitable examples of other nonaqueous solvents include one or more selected from the group consisting of a cyclic ether, such as tetrahydrofuran, 2-methyltetrahydrofuran, or 1,4-dioxane; a linear ether, such as 1,2-dimethoxyethane, 1,2-diethoxyethane, or 1,2-dibutoxyethane; an amide, such as dimethylformamide, a sulfone, such as sulfolane; and a lactone, such as Y-butyrolactone [GBL], γ-valerolactone, or α-angelicalactone.

In general, the other nonaqueous solvents are mixed and used for the purpose of attaining appropriate physical properties. Suitable examples of a combination thereof include a combination of a cyclic carbonate, a linear ester, and a lactone, or a combination of a cyclic carbonate, a linear ester, and an ether. A combination of a cyclic carbonate, a linear ester, and a lactone is more preferred, and among the lactone, GBL is further preferably used.

A content of the other nonaqueous solvents is preferably 1% by mass or more, and more preferably 2% by mass or more, and is preferably 40% by mass or less, more preferably 30% by mass or less, and even more preferably 20% by mass or less with respect to the total amount of the nonaqueous electrolytic solution. Within this concentration range, there is less concern that the electroconductivity is worsened and the high-temperature charging storage properties are worsened due to decomposition of the solvent.

For the purpose of further improving high-temperature charging storage properties and preventing gas generation, it is preferred to further add other additives to the nonaqueous electrolytic solution.

Specific examples of other additives include the following compounds (A) to (J).

(A) One or more nitriles selected from the group consisting of a nitrile having one cyano group in a molecule thereof, such as acetonitrile, propionitrile, butyronitrile, pentanenitrile, hexanenitrile, decanenitrile, undecanenitrile, dodecanenitrile, cyclohexanecarbonitrile, acrylonitrile, methacrylonitrile, and crotononitrile, a nitrile having two cyano groups in a molecule thereof, such as malononitrile, succinonitrile, glutaronitrile, adiponitrile, pimelonitrile, suberonitrile, sebaconitrile, methylmalononitrile, ethylmalononitrile, bicyclocyclohexyl-1,1-dicarbonitrile, and 1,2-didianobenzene, and a nitrile having three cyano groups in a molecule thereof, such as 1,2,3-propanetricarbonitrile, 1,2,3-tris(2-cyanoethoxy) propane, 1,3,5-cyclohexanetricarbonitrile, and 1,3,5-benzenetricarbonitrile.

(B) Aromatic compounds having a branched alkyl group, such as cyclohexylbenzene, tert-butylbenzene, tert-amylbenzene, or 1-fluoro-4-tert-butylbenzene, and aromatic compounds, such as biphenyl, terphenyl (o-, m-, p-form), fluorobenzene, methylphenyl carbonate, ethylphenyl carbonate, or diphenyl carbonate.

Among the aromatic compounds, one or more selected from the group consisting of biphenyl, terphenyl (o-, m-, p-form), fluorobenzene, cyclohexylbenzene, tert-butylbenzene, and tert-amylbenzene are more preferred, and one or more selected from the group consisting of biphenyl, o-terphenyl, fluorobenzene, cyclohexylbenzene, and tert-amylbenzene are even more preferred.

(C) One or more isocyanate compounds selected from the group consisting of methyl isocyanate, ethyl isocyanate, butyl isocyanate, phenyl isocyanate, vinyl isocyanate, propargyl isocyanate, cyclohexyl isocyanate, phenyl isocyanate, monomethylene diisocyanate, tetramethylene diisocyanate, hexamethylene diisocyanate, octamethylene diisocyanate, 1,4-phenylene diisocyanate, 2-isocyanatoethyl acrylate, 2-isocyanatoethyl methacrylate, 1,3-diisocyanatopropane, carbonyl diisocyanate, 1,4-diisocyanato-2-fluorobutane, and 1,3-bis(isocyanatomethyl)cyclohexane.

Among the isocyanate compounds, one or more selected from the group consisting of hexamethylene diisocyanate, octamethylene diisocyanate, 2-isocyanatoethyl acrylate, 2-isocyanatoethyl methacrylate, and 1,3-bis(isocyanatomethyl)cyclohexane are more preferred.

(D) One or more triple bond-containing compounds selected from the group consisting of 2-propynyl methyl carbonate, 2-propynyl acetate, 2-propynyl formate, 2-propynyl methacrylate, 2-propynyl methanesulfonate, 2-propynyl vinylsulfonate, 2-propynyl 2-(methanesulfonyloxy) propionate, di(2-propynyl) oxalate, 2-butyne-1,4-diyl dimethanesulfonate, and 2-butyne-1,4-diyl diformate.

As the triple bond-containing compound, one or more selected from the group consisting of 2-propynyl methyl carbonate, 2-propynyl methacrylate, 2-propynyl methanesulfonate, 2-propynyl vinylsulfonate, di(2-propynyl) oxalate, and 2-butyne-1,4-diyl dimethanesulfonate are preferred, and one or more selected from the group consisting of 2-propynyl methanesulfonate, 2-propynyl vinylsulfonate, di(2-propynyl) oxalate, and 2-butyne-1,4-diyl dimethanesulfonate are more preferred.

(E) One or more S—O group-containing compounds selected from the group consisting of cyclic sulfonates, such as 1,3-propanesultone, 1,3-butanesultone, 2,4-butanesultone, 1,4-butanesultone, 1,5-pentanesultone, 1-fluoro-1,3-propanesultone, 1-methyl-1,3-propanesultone, 1-propene-1,3-sultone, 2-propene-1,3-sultone, 1-fluoro-1-propene-1,3-sultone, 1-methyl-1-propene-1,3-sultone, methylene methane disulfonate, ethylene methane disulfonate, and 2,2-dioxide-1,2-oxathiolane-4-yl acetate; linear sulfonates, such as alkyl disulfonates, such as methyl fluorosulfonate, methyl methanesulfonate, ethyl methanesulfonate, busulfan, methyl methanesulfonyloxyacetate, pentafluorophenyl methanesulfonate, methyl vinylsulfonate, allyl vinylsulfonate, 2-propynyl vinylsulfonate, propargyl allylsulfonate, methoxycarbonylmethyl methanedisulfonate, methanedisulfonate, ethoxycarbonylmethyl methoxycarbonylmethyl 1,3-butanedisulfonate, ethoxycarbonylmethyl 1,3-butanedisulfonate, 1-methoxycarbonylethyl 1,3-butanedisulfonate, 1-ethoxycarbonylethyl 1,3-butanedisulfonate, butane-2,3-diyl dimethanesulfonate, and butane-1,4-diyl dimethanesulfonate; vinylsulfone compounds, such as divinyl sulfone, 1,2-bis (vinylsulfonyl) ethane, or bis(2-vinylsulfonylethyl) ether; linear sulfates such as dimethyl sulfate, ethylmethyl sulfate, and diethyl sulfate; cyclic sulfates, such as 1,2-ethylene sulfate, 1,2-propylene sulfate, 1,3-propylene sulfate, and 1,2-butylene sulfate; linear sulfites, such as dimethyl sulfite, ethylmethyl sulfite, and diethyl sulfite; and cyclic sulfites, such as 1,2-ethylene sulfite, 1,2-propylene sulfite, 1,3-propylene sulfite, 1,2-butylene sulfite, and 1-vinyl-1,2-ethylene sulfite.

The S—O group-containing compound can be classified into a cyclic S=O group-containing compound and a linear S=O group-containing compound. Among the cyclic S=O group-containing compound, suitable examples thereof include one or more selected from the group consisting of 1,3-propanesultone, 1,3-butanesultone, 1,4-butanesultone, 2,4-butanesultone, 1-propene-1,3-sultone, 2,2-dioxide-1,2-oxathiolane-4-yl acetate, methylene methane disulfonate, 1,2-ethylene sulfate, 1,2-ethylene sulfite, and 1-vinyl-1,2-ethylene sulfite. Among the linear S=O group-containing compound, suitable examples thereof include one or more selected from the group consisting of butane-2,3-diyl dimethanesulfonate, butane-1,4-diyl dimethanesulfonate, dimethyl methanedisulfonate, pentafluorophenyl methanesulfonate, divinyl sulfone, and bis(2-vinylsulfonylethyl) ether. Among the cyclic or linear S=O group-containing compounds, one or more selected from the group consisting of 1,3-propanesultone, 1,4-butanesultone, 2,4-butanesultone, 1,2-ethylene sulfate, 1,2-ethylene sulfite, 1-vinyl-1,2-ethylene sulfite, 2,2-dioxide-1,2-oxathiolane-4-yl acetate, pentafluorophenyl methanesulfonate, and divinyl sulfone are more preferred.

(F) Cyclic acetal compounds having an "acetal group" in a molecule thereof. A type of the cyclic acetal compound is not particularly limited as long as the "acetal group" is contained in the molecule thereof. Specific examples thereof include a cyclic acetal compound, such as 1,3-dioxolane, 1,3-dioxane, or 1,3,5-trioxane.

As the cyclic acetal compound, 1,3-dioxolane or 1,3-dioxane is preferred, and 1,3-dioxane is more preferred.

(G) One or more phosphorus-containing compounds selected from the group consisting of trimethyl phosphate, tributyl phosphate, trioctyl phosphate, tris(2,2,2-trifluoroethyl)phosphate, ethyl 2-(diethoxyphosphoryl)acetate, and 2-propynyl 2-(diethoxyphosphoryl)acetate.

As the phosphorus-containing compound, ethyl 2-(diethoxyphosphoryl)acetate or 2-propynyl 2-(diethoxyphosphoryl)acetate is preferred, and 2-propynyl 2-(diethoxyphosphoryl)acetate is more preferred.

(H) Acid anhydrides having a "C(=O)—O—C(=O) group", a "C(=O)—O—S(=O)$_2$ group", or a "S(=O)$_2$—O—S(=O)$_2$ group" in a molecule thereof. Specific examples thereof include one or more acid anhydrides selected from the group consisting of acetic anhydride, acrylic anhydride, methacrylic anhydride, cyclohexanecarboxylic anhydride, propylic anhydride, benzoic anhydride, fluoroacetic anhydride, 4-fluorobenzoic anhydride, acetic acid propionic anhydride, succinic anhydride, maleic anhydride, citraconic anhydride, 4-fluorosuccinic anhydride, allyl succinic anhydride, glutaric anhydride, itaconic anhydride, 1,2-oxathiolane-5-one 2,2-dioxide, and 1,2,6-oxadithiane 2,2,6,6-tetraoxide.

As the acid anhydride, methacrylic anhydride, succinic anhydride, maleic anhydride, allyl succinic anhydride, and 1,2,6-oxadithiane 2,2,6,6-tetraoxide are preferred, and succinic anhydride, allyl succinic anhydride, and 1,2,6-oxadithiane 2,2,6,6-tetraoxide are more preferred.

(J) Phosphazene compounds having a "N=P—N group" in a molecule thereof. A type of the phosphazene compound is not particularly limited as long as the "N=P—N group" is contained in the molecule thereof. Specific examples thereof include cyclic phosphazene compounds, such as methoxypentafluorocyclotriphosphazene, ethoxypentafluorocyclotriphosphazene, phenoxypentafluorocyclotriphosphazene, or ethoxyheptafluorocyclotetraphosphazene.

As the cyclic phosphazene compound, cyclic phosphazene compounds, such as ethoxypentafluorocyclotriphosphazene, methoxypentafluorocyclotriphosphazene, or phenoxypentafluorocyclotriphosphazene, are preferred, and methoxypentafluorocyclotriphosphazene or ethoxypentafluorocyclotriphosphazene is more preferred.

(K) Organic compounds having an isocyanuric acid structure (hereinafter also referred to as an "isocyanurate compound") are not particularly limited as long as they are an organic compound having at least one isocyanuric acid structure in a molecule thereof. Examples of the organic compound having an isocyanuric acid structure include the following compounds.

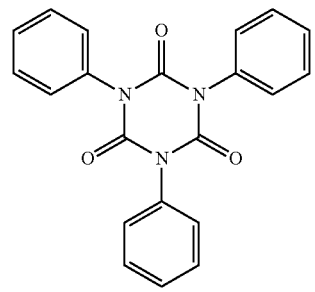

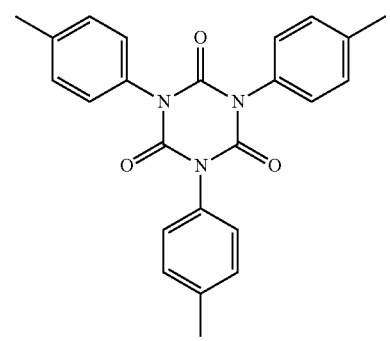

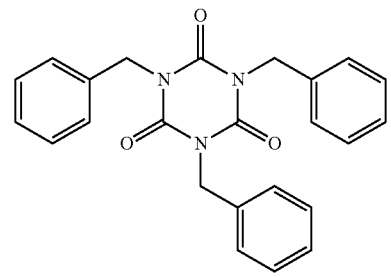

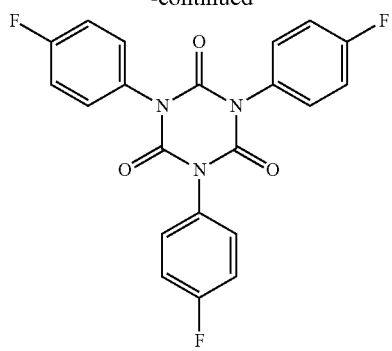
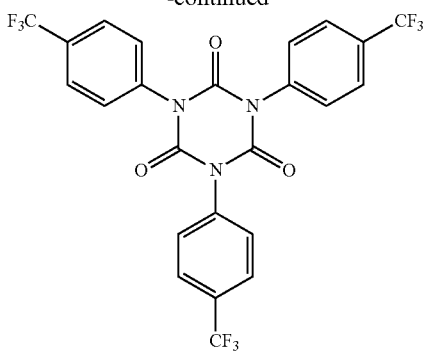
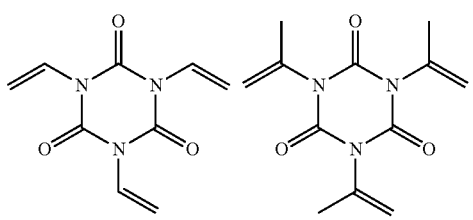

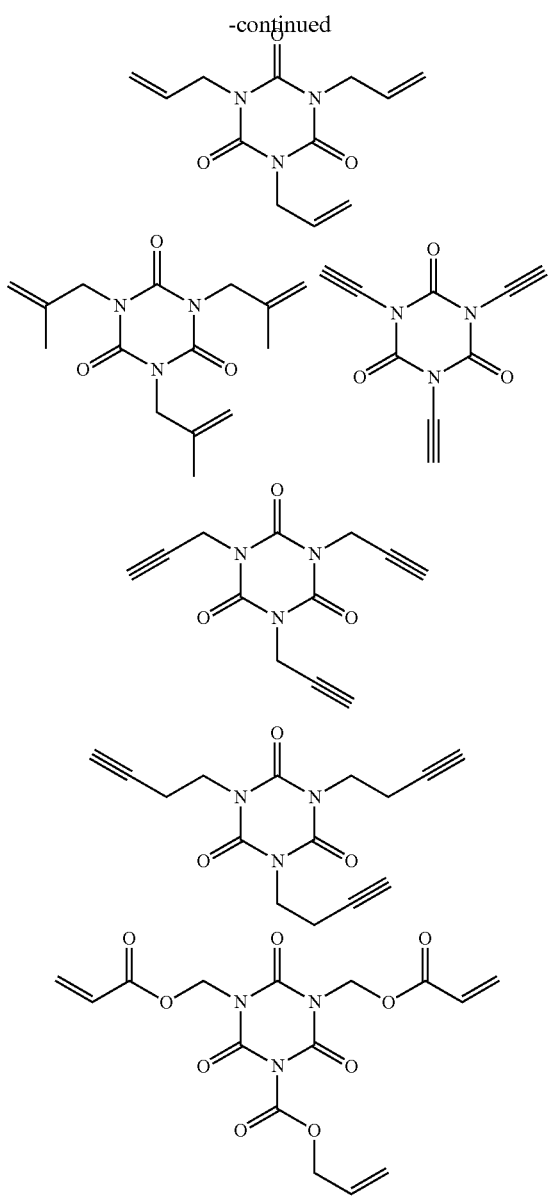

In particular, from the viewpoint of forming a stable interface protective surface film, an isocyanurate compound having a saturated or unsaturated aliphatic hydrocarbon group which may have a halogen atom is preferred, an isocyanurate compound having an unsaturated aliphatic hydrocarbon group that contains a carbon-carbon unsaturated bond at a terminal is more preferred, and triallyl isocyanurate is even more preferred.

(L) A silicon-containing compound is not particularly limited as long as it is a compound having at least one silicon atom in a molecule thereof.

Examples of the silicon-containing compound include boric acid compounds, such as tris(trimethylsilyl) borate, tris(trimethoxysilyl) borate, tris(triethylsilyl) borate, and tris(dimethylvinylsilyl) borate; phosphoric acid compounds, such as tris(trimethylsilyl)phosphate, tris(triethylsilyl)phosphate, tris(triphenylsilyl)phosphate, tris(trimethoxysilyl) phosphate, and tris(dimethylvinylsilyl)phosphate; phosphorous acid compounds, such as tris(trimethylsilyl)phosphite, tris(triethylsilyl)phosphite, tris(triphenylsilyl)phosphite, tris(trimethoxysilyl)phosphite, and tris(dimethylvinylsilyl) phosphite; sulfonic acid compounds, such as trimethylsilyl methanesulfonate and trimethylsilyl tetrafluoromethanesulfonate; silane compounds, such as tetramethylsilane, trimethylvinylsilane, dimethyldivinylsilane, methyltrivinylsilane, and tetravinylsilane; disilane such compounds, as hexamethyldisilane, hexaethyldisilane, 1,1,2,2-tetramethyldisilane, and 1,2-diphenyltetramethyldisilane; and disiloxane compounds, such as hexamethyldisiloxane, 1,3-divinyltetramethyldisiloxane, and 1,1,3,3-tetramethyl-1,3-diphenyldisiloxane.

In particular, from the viewpoint of forming a stable interface protective surface film, disilane compounds and disiloxane compounds are preferred, disiloxane compounds are more preferred, hexamethyldisiloxane, 1,3-divinyltetramethyldisiloxane are even more preferred, and 1,3-divinyltetramethyldisiloxane is particularly preferred.

Among the above, it is preferred that one or more selected from the group consisting of the nitrile (A), the aromatic compound (B), and the isocyanate compound (C) are contained since the electrochemical characteristics at a high temperature are further improved.

A content of the above compounds (A) to (C) is preferably 0.01% by mass or more and 7% by mass or less with respect to the total amount of the nonaqueous electrolytic solution. Within this range, a surface film is sufficiently formed without causing an excessive increase in thickness, the high-temperature charging storage properties can be improved, and gas generation can be prevented. The content is more preferably 0.05% by mass or more, and even more preferably 0.1% by mass or more, and is more preferably 5% by mass or less, and even more preferably 3% by mass or less with respect to the total amount of the nonaqueous electrolytic solution.

It is preferred that one or more selected from the group consisting of the triple bond-containing compound (D), the S=O group-containing compound (E), the cyclic acetal compound (F), the phosphorus-containing compound (G), the acid anhydride (H), the cyclic phosphazene compound (J), the organic compound having an isocyanuric acid structure (K), and the silicon-containing compound (L) are contained since the high-temperature charging storage properties can be improved and gas generation can be prevented.

A content of each of the compounds (D) to (L) is preferably 0.001% by mass or more and 5% by mass or less with respect to the total amount of the nonaqueous electrolytic solution. Within this range, a surface film is sufficiently formed without causing an excessive increase in thickness, the high-temperature charging storage properties can be further improved, and gas generation can be prevented. The content is more preferably 0.01% by mass or more, and even more preferably 0.1% by mass or more, and is more preferably 3% by mass or less, and even more preferably 2% by mass or less with respect to the total amount of the nonaqueous electrolytic solution.

In addition, for the purpose of further improving the electrochemical characteristics at a high temperature, it is preferred that the nonaqueous electrolytic solution further contains a lithium salt (c) having an oxalic acid structure.

Specific suitable examples of the lithium salt (c) include lithium bis(oxalato) borate [LiBOB], lithium difluoro (oxalato) borate [LiDFOB], lithium tetrafluoro (oxalato)phosphate [LiTFOP], and lithium difluorobis(oxalato)phosphate [LiDFOP].

A content of the lithium salt (c) in the nonaqueous electrolytic solution according to the present invention is preferably 0.01% by mass or more and 8% by mass or less with respect to the total amount of the nonaqueous electrolytic solution. Within this range, high-temperature charging storage properties can be further improved, and gas generation can be further prevented. The content is more preferably 0.1% by mass or more, even more preferably 0.3% by mass or more, and particularly preferably 0.4% by mass or more, and is more preferably 6% by mass or less, and even more preferably 3% by mass or less with respect to the total amount of the nonaqueous electrolytic solution.

In the present specification, a composition of the nonaqueous electrolytic solution means a composition during shipment of an energy storage device injected with the nonaqueous electrolytic solution. However, it is not always necessary to analyze the composition of the nonaqueous electrolytic solution during the shipment. The energy storage device may be produced such that the composition during the shipment is within a desired range, for example, by measuring contents of constituent components when producing the nonaqueous electrolytic solution, when injecting the nonaqueous electrolytic solution into an energy storage device, or the like.

That is, the nonaqueous electrolytic solution may be obtained by mixing to have a composition in which a ratio of each constituent component is predetermined when producing the nonaqueous electrolytic solution. Further, after the nonaqueous electrolytic solution is produced, the nonaqueous electrolytic solution itself can be subjected to analysis to confirm the composition. In addition, the nonaqueous electrolytic solution may be recovered from a completed energy storage device and used for analysis. Examples of a method for recovering the nonaqueous electrolytic solution include a method in which an electrolytic solution is collected by partially or entirely opening an energy storage device container or by providing a hole in the energy storage device container. The electrolytic solution may be recovered by centrifuging the opened energy storage device container, or the electrolytic solution may be extracted by charging an extraction solvent (for example, acetonitrile dehydrated to a water content of 10 ppm or less is preferred) to the opened energy storage device container or by bringing the extraction solvent into contact with an energy storage device element. The nonaqueous electrolytic solution recovered by such a method can be used for analysis. In addition, the recovered nonaqueous electrolytic solution may be diluted and used for analysis in order to obtain conditions suitable for analysis.

As a method for analyzing the nonaqueous electrolytic solution, optimum methods are different depending on the type of the composition of the nonaqueous electrolytic solution and the like, and specific examples thereof include analysis by inductively coupled plasma (ICP) emission spectrometry, nuclear magnetic resonance (hereinafter, may be abbreviated as NMR), gas chromatography, and liquid chromatography, such as ion chromatography. Hereinafter, an analysis method by NMR will be described. Under an inert atmosphere, the nonaqueous electrolytic solution is dissolved in a deuterated solvent dehydrated to 10 ppm or less, and the solution is charged into an NMR tube for an NMR measurement. A double tube may be used as the NMR tube, one of which may be charged with the nonaqueous electrolytic solution and the other of which may be charged with the deuterated solvent for the NMR measurement. Examples of the deuterated solvent include deuterated acetonitrile and deuterated dimethyl sulfoxide. When determining concentrations of the constituent components of the nonaqueous electrolytic solution, a specific amount of a standard substance is dissolved in the deuterated solvent, and concentrations of respective constituent components may be calculated based on a spectral ratio. Concentrations of one or more components constituting the nonaqueous electrolytic solution may be determined in advance by another analysis method, such as gas chromatography, and the concentration may be calculated based on a spectral ratio of a component with a known concentration to another component. A nuclear magnetic resonance analyzer to be used preferably has a proton resonance frequency of 400 MHz or more. Examples of measurement nuclides include 1H, 31P, 19F, and 11B.

One of these analysis methods may be used alone, or two or more of these analysis methods may be used in combination.

[Method for Producing Nonaqueous Electrolytic Solution]

The nonaqueous electrolytic solution according to the present invention can be obtained, for example, by mixing the nonaqueous solvent, adding the electrolyte salt thereto, and adding the compound represented by the general formula (I) to the nonaqueous electrolytic solution.

In this case, it is preferred that the compound to be added to the nonaqueous solvent and the nonaqueous electrolytic solution to be used is purified in advance so as to contain as few impurities as possible within a range where productivity is not greatly reduced.

[Energy Storage Device]

The nonaqueous electrolytic solution according to the present invention may be used in an energy storage device, in which a nonaqueous electrolyte may be used not only in the form of a liquid but also in the form of a gel. Further, the nonaqueous electrolytic solution according to the present invention may also be used as a solid polymer electrolyte. Among them, the nonaqueous electrolytic solution according to the present invention is preferably used in an energy storage device using a lithium salt as the electrolyte salt.

An energy storage device according to the present invention includes a positive electrode, a negative electrode, and a nonaqueous electrolytic solution having an electrolyte salt dissolved in a nonaqueous solvent. The nonaqueous electrolytic solution is the nonaqueous electrolytic solution according to the present invention. The energy storage device according to the present invention is preferably a lithium battery or a capacitor using a lithium salt as the electrolyte salt, and more preferably a lithium battery.

[Lithium Battery]

In the present specification, the term "lithium battery" is a generic term for a lithium primary battery and a lithium secondary battery. In the present specification, the term "lithium secondary battery" is used as a concept including a so-called lithium ion secondary battery.

A lithium battery, which is the energy storage device according to the present invention, includes a positive electrode, a negative electrode, and the nonaqueous electrolytic solution having an electrolyte salt dissolved in a nonaqueous solvent. Constituent members other than the nonaqueous electrolytic solution, such as a positive electrode and a negative electrode, can be used without particular limitation.

(Positive Electrode Active Material)

As a positive electrode active material for a lithium secondary battery, for example, a lithium complex metal oxide containing one or more selected from the group consisting of cobalt, manganese, and nickel is used. Such a positive electrode active material may be used alone or in combination of two or more thereof.

Suitable examples of such a lithium complex metal oxide include one or more selected from the group consisting of $LiCoO_2$, $LiCo_{1-x}M_xO_2$ (wherein M is one or more elements selected from the group consisting of Sn, Mg, Fe, Ti, Al, Zr, Cr, V, Ga, Zn, and Cu, $0.001 \leq x \leq 0.05$), $LiMn_2O_4$, $LiNiO_2$, $LiCo_{1-x}Ni_xO_2$ ($0.01<x<1$), $LiCo_{1/3}Ni_{1/3}Mn_{1/3}O_2$, $LiNi_{0.5}Mn_{0.3}Co_{0.2}O_2$, $LiNi_{7.0}Mn_{1.5}Co_{1.5}O_2$, $LiNi_{0.8}Mn_{0.1}Co_{0.1}O_2$, $LiNi_{0.8}Co_{0.15}Al_{0.05}O_2$, a solid solution of $Li_2MnO_3$ and $LiMO_2$ (wherein M is a transition metal, such as Co, Ni, Mn, and Fe), and $LiNi_{1/2}Mn_{3/2}O_4$. Two or more thereof can be used in combination. In addition, $LiCoO_2$ and $LiMn_2O_4$, $LiCoO_2$ and $LiNiO_2$, and $LiMn_2O_4$ and $LiNiO_2$ may be used in combination.

In particular, since a positive electrode active material containing Ni has a large theoretical Li absorption amount, it is preferred to use the positive electrode active material containing Ni as the positive electrode active material of the energy storage device. However, in the positive electrode active material containing Ni, decomposition of the non-aqueous solvent occurs on a positive electrode surface due to a catalytic action of Ni, and resistance of the battery tends to increase. In particular, the battery characteristics under a high-temperature environment tend to worsen, but in the lithium secondary battery according to the present invention, the worsening of the battery characteristics can be prevented. From the viewpoint of improving the capacity of the energy storage device, it is preferred that a positive electrode active material in which a proportion of an atomic concentration of Ni to an atomic concentration of all transition metal elements in the positive electrode active material exceeds 30 atomic % is used since the above-described effects become remarkable. The case where the proportion is 50 atomic % or more is more preferred, and the case where the proportion is 75 atomic % or more is particularly preferred.

Specific suitable examples thereof include $LiCo_{1/3}Ni_{1/3}Mn_{1/3}O_2$, $LiNi_{0.5}Mn_{0.3}Co_{0.2}O_2$, $LiNi_{7.0}Mn_{1.5}Co_{1.5}O_2$, $LiNi_{0.8}Mn_{0.1}Co_{0.1}O_2$, and $LiNi_{0.8}Co_{0.15}Al_{0.05}O_2$. Among them, nickel, cobalt, and manganese-based ternary positive electrode active materials (NCM) are preferred, and one or more selected from $LiNi_{0.8}Mn_{0.1}Co_{0.1}O_2$, $LiNi_{7.0}Mn_{1.5}Co_{1.5}O_2$, and $LiCo_{13}Ni_1Mn_{13}O_2$ are more preferred.

A lithium-containing olivine-type phosphate salt may also be used as the positive electrode active material. In particular, a lithium-containing olivine-type phosphate salt containing at least one or more selected from the group consisting of iron, cobalt, nickel, and manganese is preferred. Specific examples thereof include $LiFePO_4$, $LiCoPO_4$, $LiNiPO_4$, and $LiMnPO_4$.

A part of such a lithium-containing olivine-type phosphate salt may be substituted with other elements. A part of iron, cobalt, nickel, or manganese may be substituted with one or more elements selected from Co, Mn, Ni, Mg, Al, B, Ti, V, Nb, Cu, Zn, Mo, Ca, Sr, W, Zr, and the like, or the lithium-containing olivine-type phosphate salt may be coated with a compound containing any of these other elements or with a carbon material. Among them, $LiFePO_4$ and $LiMnPO_4$ are preferred.

The lithium-containing olivine-type phosphate salt may also be used, for example, in admixture with the above positive electrode active material.

The positive electrode active material is not particularly limited. When a positive electrode active material containing Co, Ni is used, the battery characteristics can be particularly improved. Suitable examples of the positive electrode active material include $LiCoO_2$, $LiCo_{1/3}Ni_{1/3}Mn_{1/3}O_2$, $LiNi_{0.5}Mn_{0.3}Co_{0.2}O_2$, $LiNi_{0.8}Mn_{0.1}Co_{0.1}O_2$, and $LiNi_{0.8}Co_{0.15}Al_{0.05}O_2$.

An electroconductive agent of the positive electrode is not particularly limited as long as it is an electron-conductive material that does not undergo a chemical change. Examples thereof include graphite, such as natural graphite (e.g., flaky graphite) and artificial graphite, and carbon black, such as acetylene black, Ketjen black, channel black, furnace black, lamp black, and thermal black. The graphite and the carbon black may be appropriately mixed and used. An amount of the electroconductive agent added to a positive electrode mixture is preferably 1% by mass or more and 10% by mass or less, and more preferably 2% by mass or more and 5% by mass or less.

The positive electrode may be produced in such a manner that the positive electrode active material is mixed with an electroconductive agent, such as acetylene black and carbon black, and then mixed with a binder, such as polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), and an ethylene-propylene-diene terpolymer, to which is then added with a high-boiling point solvent, such as 1-methyl-2-pyrrolidone, followed by kneading to provide a positive electrode mixture, and the positive electrode mixture is applied onto a collector, such as an aluminum foil and a stainless steel-made lath plate, dried, shaped under a pressure, and then heat-treated in vacuum at a temperature of about 50° C. to 250° C. for about 2 hours.

(Negative Electrode Active Material)

As a negative electrode active material for a lithium secondary battery, for example, one selected from metal lithium, a lithium alloy, a carbon material capable of absorbing and releasing lithium ions [e.g., graphitizable carbon, non-graphitizable carbon having a spacing of a (002) plane of 0.37 nm or more, and graphite having a spacing of a (002) plane of 0.34 nm or less], tin (elemental substance), a tin compound, silicon (elemental substance), a silicon compound, and a lithium titanate compound, such as $Li_4Ti_5O_{12}$, alone or in combination of two or more thereof may be used.

Among them, in terms of the ability of absorbing and releasing lithium ions, the use of a high-crystalline carbon material, such as artificial graphite or natural graphite, is preferred, and the use of a carbon material having a graphite-type crystal structure in which a lattice (002) spacing ($d_{002}$) is 0.340 nm (nanometers) or less (preferably 0.335 nm to 0.337 nm) is more preferred.

Artificial graphite particles having a bulky structure containing a plurality of flattened graphite fine particles that are aggregated or bonded non-parallel to each other, or graphite particles produced through a spheroidizing treatment of flaky natural graphite particles by repeatedly applying a mechanical action, such as a compression force, a friction force, and a shear force, are used. Therefore, it is preferred that a ratio I (110)/1 (004) of a peak intensity I (110) of a (110) plane to a peak intensity I (004) of a (004) plane of the graphite crystal obtained through X-ray diffractometry of a negative electrode sheet that is shaped under a pressure to such an extent that a density of the negative electrode except for the collector is 1.5 g/cm³ or more is 0.01 or more, since a metal elution amount from the positive electrode active material is further improved and the charging storage properties are improved. The case where the ratio I(110)/I(004) is 0.05 or more is more preferred, and the case where the ratio I(110)/I(004) is 0.1 or more is even more preferred. An upper limit thereof is preferably 0.5 or less, and more preferably 0.3 or less since there may be the case where the crystallinity is worsened to worsen the discharge capacity of the battery due to an excessive treatment.

It is preferred that the high-crystalline carbon material (core material) is coated with a carbon material having lower crystallinity than the core material since the high-temperature charging storage properties become much more favorable. The crystallinity of the carbon material for the coating may be confirmed by a transmission electron microscope (TEM).

When the high-crystalline carbon material is used, there is a tendency that it reacts with the nonaqueous electrolytic solution during charging, thereby worsening the high-temperature charging storage properties due to an increase in interface resistance. However, in the lithium secondary battery according to the present invention, the high-temperature charging storage characteristics become favorable.

Examples of the metal compound capable of absorbing and releasing lithium ions as the negative electrode active material include a compound containing at least one metal element, such as Si, Ge, Sn, Pb, P, Sb, Bi, Al, Ga, In, Ti, Mn, Fe, Co, Ni, Cu, Zn, Ag, Mg, Sr, and Ba. The metal compound may be in any form including an elemental substance, an alloy, an oxide, a nitride, a sulfide, a boride, an alloy with lithium, and the like, and any of an elemental substance, an alloy, an oxide, and an alloy with lithium are preferred since the capacity can be increased. Among them, a compound containing at least one element selected from Si, Ge, and Sn is preferred, and a compound containing at least one element selected from Si and Sn is particularly preferred since the capacity of the battery can be increased.

Further, the metal compound capable of absorbing and releasing lithium ions as the negative electrode active material is preferably a metal compound containing a Si element and a Ti element since the battery characteristics can be improved. Among the metal compound containing a Si element, $SiO_x$, which is a composite material of Si and $SiO_2$, is preferred since the battery characteristics including the cycle retention rate can be further improved. The range of x is 0<x<2. Among the metal compound containing a Ti element, a titanium-containing metal oxide containing $Li_4Ti_5O_{12}$ and/or $TiNb_2O_7$ as a main component is preferred in terms of improving the safety of the battery since it has little expansion and contraction during charging and discharging and is flame-retardant.

From the above, the negative electrode active material for a lithium secondary battery is not particularly limited as long as it can absorb and release lithium ions, and it is preferred to use one selected from the group consisting of metal lithium, a carbon material, metal silicon, a metal oxide containing a Si element ($SiO_x$), and a metal oxide containing a Ti element ($Li_4Ti_5O_{12}$, $TiNb_2O_7$, etc.) alone or in combination of two or more thereof, and it is more preferable to use one selected from a carbon material, metal silicon, and $SiO_x$ alone or in combination of two or more thereof.

When a carbon material and metal silicon or $SiO_x$ are used in combination as the negative electrode active material, a weight ratio of metal silicon or $SiO_x$ is not particularly limited, and is preferably 30% by mass or less, and more preferably 10% by mass or less, with respect to a total mass of a negative electrode mixture containing a negative electrode active material, an electroconductive agent, a binder, and a high-boiling point solvent.

The negative electrode may be produced in such a manner that the same electroconductive agent, binder, and high-boiling point solvent as in the production of the positive electrode as described above are used and kneaded to provide a negative electrode mixture, and the negative electrode mixture is then applied on a collector, such as a copper foil, dried, shaped under a pressure, and then heat-treated in vacuum at a temperature of about 50° C. to 250° C. for about 2 hours.

A density of the negative electrode except for the collector is generally 1.1 g/cm³ or more, and for the purpose of further increasing the capacity of the battery, the density is preferably 1.4 g/cm³ or more, and more preferably 1.7 g/cm³ or more, and is preferably 2 g/cm³ or less.

Examples of the negative electrode active material for a lithium primary battery include metal lithium and a lithium alloy.

The structure of the lithium battery is not particularly limited, and may be a coin-type battery, a cylinder-type battery, a prismatic battery, a laminate-type battery, or the like, each having a single-layered or multi-layered separator.

The separator for the battery is not particularly limited, and a single-layered or laminated micro-porous film made of a polyolefin, such as polypropylene and polyethylene, a woven fabric, a nonwoven fabric, and the like may be used.

The lithium secondary battery in the present invention has excellent cycle properties even when a final charging voltage is 4.2 V or more, particularly 4.3 V or more, and further, the characteristics are favorable even at 4.4 V or more. A final discharging voltage may be generally 2.8 V or more, and further 2.5 V or more, and the final discharging voltage of the lithium secondary battery in the present invention may be 2.0 V or more. A current value is not particularly limited, and in general, the battery may be used within a range of 0.1 C to 30 C. The lithium battery in the present invention may be charged and discharged at −40° C. to 100° C., and preferably −10° C. to 80° C.

In the present invention, as a countermeasure against the increase in internal pressure of the lithium battery, there may also be adopted such a method that a safety valve is provided in a battery cap, or a cutout is provided in a component, such as a battery can and a gasket. As a safety countermeasure for prevention of overcharging, a current cut-off mechanism capable of detecting the internal pressure of the battery to cut off the current may be provided in the battery cap.

[Capacitor]

Examples of a capacitor containing the nonaqueous electrolytic solution according to the present invention include an electric double layer capacitor and a lithium ion capacitor.

The electric double layer capacitor is an energy storage device that stores energy by utilizing an electric double layer capacitance in an interface between the electrolytic solution and the electrode. A most typical electrode active material which is used in this energy storage device is active carbon. The electric double layer capacitance increases substantially in proportion to a surface area.

The lithium ion capacitor (LIC) is an energy storage device that stores energy by utilizing intercalation of lithium ions into a carbon material, such as graphite, as the negative electrode. Examples of the positive electrode include a positive electrode utilizing an electric double layer between an active carbon electrode and an electrolytic solution, and a positive electrode utilizing a doping/dedoping reaction of a n-conjugated polymer electrode. The electrolytic solution contains a lithium salt, such as $LiPF_6$.

EXAMPLES

Hereinafter, Synthesis Examples of the compound according to the present invention and Examples of the lithium ion secondary battery using the nonaqueous electrolytic solution according to the present invention will be described, but the present invention is not limited to these Synthesis Examples and Examples.

Synthesis Example 1 [Di-2-propynyl Vinylphosphonate (Compound 1-1)]

10 g (92.6 mmol) of vinylphosphonic acid, 44 g (370 mmol) of thionyl chloride, and 0.1 g (1.4 mmol) of N,N-dimethylformamide were stirred in 100 mL of 1,2-dichloroethane at 60° C. for 4 hours. After completion of the reaction, the reactant was cooled to room temperature, and then concentrated under a reduced pressure to obtain 12.5 g of vinylphosphonic acid dichloride.

In 60 mL of 1,2-dichloroethane, 6.7 g (46.3 mmol) of vinylphosphonic acid dichloride, 5.2 g (92.6 mmol) of propargyl alcohol, and 0.1 g (0.8 mmol) of N,N-dimethyl-aminopyridine were dissolved, followed by cooling to 0° C. To this solution, 9.4 g (92.6 mmol) of triethylamine was added dropwise at 0° C. to 10° C. over 30 minutes, and the mixture was stirred at room temperature for 1 hour and 30 minutes. After completion of the reaction, 20 mL of water was added to perform liquid separation, an organic layer was washed with 20 ml of water, and the solvent was distilled off under a reduced pressure. The residue was purified by silica gel column chromatography to obtain 6.0 g (yield: 70%) of di-2-propynyl vinylphosphonate.

Results of $^1$H-NMR measurement of the obtained di-2-propynyl vinylphosphonate (compound 1) are shown below.

$^1$H-NMR (400 MHz, CDCl$_3$): δ=6.44-6.04 (m, 3H), 4.70 (d, 4H, J=10.5 Hz), 2.56 (s, 2H).

Synthesis Example 2 [Di-2-propynyl Allylphosphonate (Compound 2-1)]

Synthesis was performed in the same manner as in Synthesis Example 1 except that the vinylphosphonic acid in Synthesis Example 1 was changed to allylphosphonic acid.

Results of $^1$H-NMR measurement of the obtained di-2-propynyl allylphosphonate (compound 2-1) are shown below.

$^1$H-NMR (400 MHZ, CDCl$_3$): δ=5.87-5.73 (m, 1H), 5.33-5.23 (m, 2H), 4.73-4.67 (m, 4H), 2.76 (ddt, 2H, J=22.4 Hz, 7.4 Hz, 1.2 Hz), 2.58 (t, 2H, J=2.5 Hz).

Synthesis Example 3 [Di-2-propynyl Crotylphosphonate (Compound 5-1)]

Synthesis was performed in the same manner as in Synthesis Example 1 except that the vinylphosphonic acid in Synthesis Example 1 was changed to crotylphosphonic acid.

Results of $^1$H-NMR measurement of the obtained di-2-propynyl crotylphosphonate (compound 5-1) are shown below.

$^1$H-NMR (400 MHZ, CDCl$_3$): δ=5.82-5.64 (m, 1H), 5.52-5.38 (m, 1H), 4.75-4.68 (m, 4H), 2.81-2.62 (m, 2H), 2.58 (t, 2H, J=2.5 Hz), 1.80-1.67 (m, 3H).

Examples 1-1 to 2-3 and Comparative Examples 1-1 and 2-1 to 2-6

[Production of Lithium Ion Secondary Battery]

90% by mass of a positive electrode active material (LiNi$_{0.8}$Mn$_{0.1}$Co$_{0.1}$O$_2$ [NCM (8/1/1)]), 3% by mass of acetylene black (electroconductive agent), and 3% by mass of KS-4 (trademark) (electroconductive agent) were added to and mixed with a solution which had been produced by dissolving 4% by mass of polyvinylidene fluoride (binder) in 1-methyl-2-pyrrolidone in advance, thereby producing a positive electrode mixture paste. The positive electrode mixture paste was applied onto both surfaces of an aluminum foil (collector), dried, treated under a pressure, followed by cutting into a predetermined size, thereby producing a rectangular positive electrode sheet. A density of the positive electrode except for the collector was 2.5 g/cm$^3$.

In addition, 98% by mass of artificial graphite (negative electrode active material), 1% by mass of carboxymethyl cellulose (thickener), and 1% by mass of a copolymer of butadiene (binder) were added to and mixed with water, thereby producing a negative electrode mixture paste. The negative electrode mixture paste was applied onto both surfaces of a copper foil (collector), dried, treated under a pressure, followed by cutting into a predetermined size, thereby producing a negative electrode sheet. A density of the negative electrode except for the collector was 1.4 g/cm$^3$. Then, the positive electrode sheet, a polyolefin laminated micro-porous film-made separator, and the negative electrode sheet were laminated in this order, and a nonaqueous electrolytic solution having each of compositions shown in Tables 1 and 2 was added, thereby producing a laminate-type battery.

In Tables 1 to 3, EC is ethylene carbonate, MEC is methyl ethyl carbonate, and VC is vinylene carbonate.

[Evaluation of Characteristics after High-temperature Charging Storage]

<Initial Discharge Capacity>

The laminate-type battery produced by the above method was subjected to the following pretreatment. Thereafter, in a 25° C. thermostatic chamber, the laminate-type battery was charged up to a final voltage of 4.2 V with a constant current of 0.2 C and under a constant voltage for 7 hours and then discharged down to a final voltage of 2.7 V with a constant current of 0.2 C, thereby determining an initial discharge capacity at 25° C.

(Pretreatment)

The laminate-type battery was charged up with a constant current of 0.05 C for 1 hour in a 25° C. thermostatic chamber, followed by standing for 6 hours. Thereafter, the laminate-type battery was charged up to 4.2 V with a constant current of 0.2 C, followed by standing in a 60° C. thermostatic chamber for 48 hours. The laminate-type battery was placed in a 25° C. thermostatic chamber, and once discharged down under a constant current of 0.2 C to a final voltage of 2.75 V. Again, the laminate-type battery was charged up to 4.2 V with a constant current of 0.2 C, and then discharged down under a constant current of 0.2 C to a final voltage of 2.75 V.

<High-Temperature Charging Storage Test>

Subsequently, in a 60° C. thermostatic chamber, this laminate-type battery was charged up to a final voltage of 4.2 V with a constant current of 1 C and under a constant voltage for 7 hours, and then the temperature of the thermostatic chamber was raised to 60° C. While being kept at 4.2 V, the laminate-type battery was stored for 20 days for the test described in Table 1, and stored for 10 days for the test described in Table 2. Thereafter, the battery was placed in a 25° C. thermostatic chamber, and once discharged down under a constant current of 0.2 C to a final voltage of 2.75 V.

<Discharge Capacity after High-Temperature Charging Storage>

Further thereafter, the discharge capacity after the high-temperature charging storage at 25° C. was determined in the same manner as in the measurement of the initial discharge capacity.

<Discharge Capacity Retention Rate after High-Temperature Charging Storage>

A discharge capacity retention rate after high-temperature charging storage was determined according to following formula using the initial discharge capacity at 25° C. and the discharge capacity at 25° C. after high-temperature charging storage.

Discharge capacity retention rate (%) at 25° C. after high-temperature charging storage=(Discharge capacity at 25° C. after high-temperature charging storage/Initial discharge capacity at 25° C.)×100

<Evaluation of Gas Generation Amount after High-Temperature Charging Storage>

A gas generation amount after high-temperature charging storage was measured by an Archimedes method. The gas generation amount is a relative value when a gas generation amount measured in a laminate-type battery containing a nonaqueous electrolytic solution that does not contain the compound of the general formula (I) is taken as 100%.

Results of the battery characteristics are shown in Tables 1 and 2.

TABLE 1

| | Positive electrode | Negative electrode | Composition of electrolyte salt and composition of nonaqueous electrolytic solution (volume ratio of solvent) | Compound represented by general formula (I) | | Lithium salt (a) | | Characteristics after high-temperature charging storage | |
|---|---|---|---|---|---|---|---|---|---|
| | | | | Compound | Content (% by mass) | Compound | Content (% by mass) | Discharge capacity retention rate (%) at 25° C. | Gas generation amount (%) |
| Example 1-1 | NCM (8/1/1) | Artificial graphite | 1.2M LiPF6 EC/MEC (30/70) | 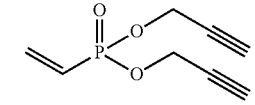 | 0.3 | None | — | 88.1 | 75 |
| Example 1-2 | | | | | 0.3 | LiPO$_2$F$_2$ | 1 | 89.4 | 19 |
| Example 1-3 | | | | 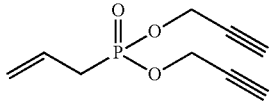 | 0.1 | LiPO$_2$F$_2$ | 1 | 88.8 | 15 |
| Example 1-4 | | | | | 0.2 | LiPO$_2$F$_2$ | 1 | 89.2 | 6 |
| Example 1-5 | | | | | 0.3 | LiPO$_2$F$_2$ | 1 | 89.6 | 4 |
| Example 1-6 | | | | | 0.5 | LiPO$_2$F$_2$ | 1 | 90.3 | 1 |
| Comparative Example 1-1 | | | | None | — | None | — | 87.0 | 100 |

TABLE 2

| | Positive electrode | Negative electrode | Composition of electrolyte salt and composition of nonaqueous electrolytic solution (volume ratio of solvent) | Compound represented by general formula (I) or other phosphorus compounds | | Cyclic carbonate having unsaturated bond | | Characteristics after high-temperature charging storage | |
|---|---|---|---|---|---|---|---|---|---|
| | | | | Compound | Content (% by mass) | Compound | Content (% by mass) | Discharge capacity retention rate (%) at 25° C. | Gas generation amount (%) |
| Example 2-1 | NCM (8/1/1) | Artificial graphite | 1.0M LiPF6 EC/MEC/DMC (30/40/30) | +get,31 | 0.5 | VC | 0.5 | 92.4 | 50 |
| Example 2-2 | | | | +get,32 | 0.5 | VC | 0.5 | 93.0 | 35 |
| Example 2-3 | | | | +get,33 | 0.5 | VC | 0.5 | 92.9 | 50 |
| Comparative Example 2-1 | | | | None | — | None | — | 92.0 | 100 |
| Comparative Example 2-2 | | | | None | — | VC | 0.5 | 92.9 | 87 |
| Comparative Example 2-3 | | | | +get,34 | 0.5 | VC | 0.5 | 94.0 | 62 |
| Comparative Example 2-4 | | | | +get,35 | 0.5 | VC | 0.5 | 92.5 | 63 |
| Comparative Example 2-5 | | | | +get,36 | 0.5 | VC | 0.5 | 92.1 | 62 |
| Comparative Example 2-6 | | | | +get,37 | 0.5 | VC | 0.5 | 92.2 | 82 |

Examples 3-1 and 3-2 and Comparative Example 3-1

[Production of Lithium Ion Secondary Battery]

A laminate-type battery was produced in the same manner as in Example 1-1 except that a positive electrode mixture paste was changed to a positive electrode mixture paste obtained by adding and mixing 90% by mass of a positive electrode active material ($LiNi_{0.70}Mn_{0.15}Co_{0.15}O_2$ [NCM (7/1.5/1.5)]) and 7% by mass of acetylene black (electro-conductive agent) to and with a solution which had been produced by dissolving 3% by mass of polyvinylidene fluoride (binder) in 1-methyl-2-pyrrolidone in advance.

[Evaluation of Characteristics after High-Temperature Charging Storage]

<Initial Discharge Capacity>

The laminate-type battery produced by the above method was subjected to a pretreatment. Thereafter, in a 25° C. thermostatic chamber, the laminate-type battery was charged up to a final voltage of 4.4 V with a constant current of 0.2 C and under a constant voltage and then discharged down to a final voltage of 2.8 V with a constant current of 0.2 C, thereby determining an initial discharge capacity at 25° C.

<High-Temperature Charging Storage Test>

Subsequently, in a 60° C. thermostatic chamber, this laminate-type battery was charged up to a final voltage of 4.4 V with a constant current of 1 C and under a constant voltage, then the temperature of the thermostatic chamber was raised to 60° C., and the laminate-type battery was stored for 14 days while being kept at 4.2 V. Thereafter, the battery was placed in a 25° C. thermostatic chamber, and once discharged down under a constant current of 0.2 C to a final voltage of 2.8 V.

<Discharge Capacity after High-Temperature Charging Storage>

Further thereafter, the discharge capacity after the high-temperature charging storage at 25° C. was determined in the same manner as in the measurement of the initial discharge capacity.

<Evaluation of Discharge Capacity Retention Rate after High-temperature Charging Storage and Gas Generation Amount after High-temperature Charging Storage>

The discharge capacity retention rate after high-temperature charging storage and the gas generation amount after high-temperature charging storage were measured in the same manner as in Example 1-1.

Results of the battery characteristics are shown in Table 3.

In each of Examples and Comparative Examples shown in Tables 1 to 3, the nonaqueous electrolytic solution according to each of Examples and Comparative Examples was produced by mixing the compound represented by the general formula (I) with an electrolytic solution having a composition described in columns of "Composition of electrolyte salt and composition of nonaqueous solvent (volume ratio of solvent)" in Tables 1 to 3 such that the content of the compound represented by the general formula (I) with respect to the entire nonaqueous electrolytic solution was the amount shown in Tables 1 to 3.

In Tables 1 to 3, in Examples using the nonaqueous electrolytic solution according to the present invention, the gas generation amount can be significantly reduced while maintaining a high capacity after high-temperature storage as compared with Comparative Examples not containing the compound of the general formula (I). From this result, it can be said that the nonaqueous electrolytic solution according to the present invention can achieve the improvement of the discharge capacity retention rate in high-temperature storage and the prevention of gas generation in a balanced manner.

INDUSTRIAL APPLICABILITY

When the nonaqueous electrolytic solution according to the present invention is used, an energy storage device having excellent electrochemical characteristics in a wide temperature range can be obtained. In particular, when the nonaqueous electrolytic solution according to the present invention is used as a nonaqueous electrolytic solution for an energy storage device, such as a lithium secondary battery to be mounted on a hybrid electric vehicle, a plug-in hybrid electric vehicle, and a battery electric vehicle, an energy storage device whose electrochemical characteristics in a wide temperature range are less likely to worsen can be obtained.

TABLE 3

| | Positive electrode | Negative electrode | Composition of electrolyte salt and composition of nonaqueous electrolytic solution (volume ratio of solvent) | Compound represented by general formula (I) Compound | Content (% by mass) | Cyclic carbonate having unsaturated bond Compound | Content (% by mass) | Characteristics after high-temperature charging storage Discharge capacity retention rate (%) at 25°C | Gas generation amount (%) |
|---|---|---|---|---|---|---|---|---|---|
| Example 3-1 | NCM (7/1.5/1.5) | Artificial graphite | 1.2M LiPF6 EC/MEC/DMC (30/40/30) | (allyl phosphonate with two propargyl groups) | 0.5 | VC | 1 | 98.1 | 55 |
| Example 3-2 | | | | | 1 | VC | 1 | 97.6 | 32 |
| Comparative Example 3-1 | | | | None | — | VC | 1 | 97.9 | 100 |

The invention claimed is:

1. A nonaqueous electrolytic solution for an energy storage device, which is the nonaqueous electrolytic solution having an electrolyte salt dissolved in a nonaqueous solvent, the nonaqueous electrolytic solution comprising:
a phosphonate represented by the following general formula (I):

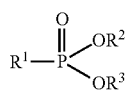

(I)

wherein $R^1$ represents an alkenyl group having 2 to 6 carbon atoms or an alkynyl group having 3 to 6 carbon atoms, and $R^2$ and $R^3$ each independently represent an alkynyl group having 3 to 6 carbon atoms, wherein the nonaqueous solvent comprises one or more selected from the group consisting of a saturated cyclic carbonate, a linear ester, a lactone, an ether, and an amide.

2. The nonaqueous electrolytic solution for an energy storage device according to claim 1, wherein a content of the phosphonate represented by the general formula (I) is 0.001% by mass or more and 5% by mass or less.

3. The nonaqueous electrolytic solution for an energy storage device according to claim 1, wherein $R^1$ in the general formula (I) is a vinyl group, an allyl group, a 1-methylallyl group, a 2-methylallyl group, a crotyl group, a butenyl group, or a propynyl group.

4. The nonaqueous electrolytic solution for an energy storage device according to claim 1, wherein $R^1$ in the general formula (I) is a vinyl group or an allyl group.

5. The nonaqueous electrolytic solution for an energy storage device according to claim 1, wherein $R^2$ and $R^3$ in the general formula (I) each independently represent a 2-propynyl group, a 2-butynyl group, a 3-butynyl group, a 1-methyl-2-propynyl group, a 1,1-dimethyl-2-propynyl group, a 1-ethyl-1-methyl-2-propynyl group, or a 4-pentynyl group.

6. The nonaqueous electrolytic solution for an energy storage device according to of claim 1, wherein the nonaqueous electrolytic solution further comprises one or more lithium salts (a) selected from the group consisting of a lithium salt having a phosphoric acid structure and a lithium salt having an S(=O) group.

7. The nonaqueous electrolytic solution for an energy storage device according to claim 6, wherein a content of the lithium salt (a) is 0.01% by mass or more and 8% by mass or less.

8. The nonaqueous electrolytic solution for an energy storage device according to claim 1, wherein the electrolyte salt comprises one or more lithium salts (b) selected from the group consisting of $LiPF_6$, $LiBF_4$, $LiN(SO_2CF_3)_2$, $LiN(SO_2C_2F_5)_2$, and $LiN(SO_2F)_2$.

9. The nonaqueous electrolytic solution for an energy storage device according to claim 8, wherein a content of the lithium salt (b) is 4% by mass or more and 28% by mass or less.

10. The nonaqueous electrolytic solution for an energy storage device according to claim 1, wherein the phosphonate comprises one or more selected from the group consisting of di-2-propynyl vinylphosphonate, di-2-propynyl allylphosphonate, di-2-propynyl 1-methylallylphosphonate, di-2-propynyl 2-methylallylphosphonate, di-2-propynyl crotylphosphonate, di-2-propynyl butenylphosphonate, and di-2-propynyl propynylphosphonate.

11. The nonaqueous electrolytic solution for an energy storage device according to claim 1, wherein the nonaqueous solvent comprises a saturated cyclic carbonate and a linear ester, and a ratio (mass ratio) of the cyclic carbonate to the linear ester is 10:90 to 50:50.

12. The nonaqueous electrolytic solution for an energy storage device according to claim 1, further comprising at least one of a cyclic carbonate having an unsaturated bond and a cyclic carbonate having a fluorine atom.

13. The nonaqueous electrolytic solution for an energy storage device according to claim 12, wherein a content of the cyclic carbonate having an unsaturated bond is 0.05% by mass or more and 8% by mass or less.

14. An energy storage device comprising:
a positive electrode;
a negative electrode; and
a nonaqueous electrolytic solution having an electrolyte salt dissolved in a nonaqueous solvent, wherein
the nonaqueous electrolytic solution is the nonaqueous electrolytic solution according to claim 1.

15. The energy storage device according to claim 14, wherein the energy storage device is a lithium battery.

16. The energy storage device according to claim 14, wherein a proportion of an atomic concentration of Ni to an atomic concentration of all transition metal elements in a positive electrode active material in the positive electrode is 50 atomic % or more.

* * * * *